(12) United States Patent
Mita et al.

(10) Patent No.: US 6,340,877 B1
(45) Date of Patent: Jan. 22, 2002

(54) RECHARGEABLE CELL SUPPORT DEVICE WITH INSULATING RINGS

(75) Inventors: Yoshinori Mita; Makoto Anazawa, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/746,074

(22) Filed: Dec. 26, 2000

(30) Foreign Application Priority Data

Dec. 28, 1999 (JP) ............................................. 11-374386
Dec. 28, 1999 (JP) ............................................. 11-374387

(51) Int. Cl.[7] .............................. H02J 7/00; H01M 2/10
(52) U.S. Cl. ......................... 320/112; 320/107; 429/99; D13/103
(58) Field of Search ................................ 320/107, 116, 320/112; 429/99; D13/103

(56) References Cited

U.S. PATENT DOCUMENTS 5,879,833 A * 3/1999 Yoshii et al. .................. 429/62
6,211,646 B1 * 4/2001 Kouzu et al. ............... 320/107

FOREIGN PATENT DOCUMENTS

JP 10-270006 10/1998

* cited by examiner

Primary Examiner—Gregory J. Toatley, Jr.
(74) Attorney, Agent, or Firm—Arent Fox Kintner Plotkin & Kahn, PLLC

(57) ABSTRACT

A charging element device comprising columnar charging element modules arranged by serially connecting cylindrical cells via an insulating ring, the module having a terminal at opposite ends thereof; charging element module groups arranged by laterally aligning the modules in parallel; a built-up construction of the modules arranged by building-up the modules groups in several stages; bus bar plates disposed at the opposite ends of the built-up construction and fitted to the terminals; bus bars disposed outside the bus bar plate and serially connecting the terminals; a housing in which cooling air flows and the built-up construction is contained; and mounting plates having a securing ring for holding and securing the insulating ring, the mounting plate being provided below the lowermost modules group, above the uppermost modules group, and between the intermediate modules groups. The mounting plates are integrally bound so as to hold and secure the insulating ring by the securing ribs, a restriction arrangement for rotation of the insulating ring is provided to the insulating ring and the securing rib.

14 Claims, 20 Drawing Sheets

RECHARGEABLE CELL SUPPORT DEVICE WITH INSULATING RINGS

BACKGROUND OF THE INVENTION

1. Technical Field

The present invention relates to a charging element device equipped in electric cars, hybrid electric cars, and the like, as a driving power supply. The invention relates to any type of charging element device, including cells such as nickel hydrogen battery and lithium batteries and energy storage devices such as double layered capacitors (ultra-capacitors).

2. Background Art

As this type of charging element device, a conventional one is known in which plural cylindrical cells are connected to each other to construct a columnar battery module. The plural cylindrical battery modules are laterally aligned in parallel to form an array, and the plural arrays are built-up. All the battery modules are serially connected to each other to generate high-voltage power. For example, Japanese Patent Application, First Publication, No. 10-270006 discloses a charging element device contained in a housing, in which battery modules are aligned in three rows, which are built-up in seven stages. Each battery module passes through holes which are provided in end walls of the housing and partitions provided in the housing, and is secured in the alignment by fitting opposite terminals thereof into resin endplates mounted on the end walls. The charging element device copes with large amounts of heat by blowing cooling air in the built-up direction (vertical direction) through the spaces divided by the partitions toward the axial direction of the battery modules.

In the battery module, the terminal is fitted into the endplate, and adjoining terminals are connected and secured by a bus bar plate, whereby the ends of the battery module are rigidly secured. In contrast, the intermediate portion of the battery module has a clearance with the circumference of the hole, and this result in vibration and bending of the battery module. Therefore, the proposed device is designed such that a rubber cushion is laminated over the partition, a cushioning ring is formed integrally with the rubber cushion, and the battery module is passed through the cushioning ring so as to hold the intermediate portion of the battery module and to restrain vibration and bending thereof.

In the design in which the battery module is aligned so as to pass through the holes provided in the end walls and partitions, the holes must be larger than the outer diameter of the battery module even though the clearance is small, and vibration and bending thereof are therefore inevitable. Although the cushioning ring as the above description holds the intermediate portion of the battery, it is not in a fixed condition and is not completely restrained, so that vibration and bending occur due to vibration and impacts during the running of a vehicle. When the vibration and bending occurring in the battery module are large, the load exerted on the fixed portion of the endplate may increase, and problems such as breaking of the endplate or loosening of the fixed portion may occur. Therefore, the strength of the fixing and the endplate itself must be increased, thereby increasing the total weight of the device.

Furthermore, in the design for cooling as in the above description, since cooling air flows during contact with the battery module, although the inlet portion may be cooled by the cooling air, the cooling effect may diminish as the distance therefrom increases. Therefore, the temperatures of the battery modules are different from each other, and this results in shortening of the service life of the device and decreases in performance in which charging and discharging are efficiently repeated.

SUMMARY OF THE INVENTION

Therefore, an object of the present invention is to provide the following charging element devices. In a charging element device constructed by assembling plural charging elements or battery modules, vibration and bending can be effectively restrained and load exerted on securing portions at opposite ends can be reduced, thereby increasing the securing strength and achieving weight reduction. Moreover, all charging elements can be cooled sufficiently and evenly, the charging and discharging efficiency and the service life can be increased.

The first aspect of the invention provides a charging element device comprising: columnar charging element modules arranged by serially connecting cylindrical cells via an insulating ring, the module having a terminal at opposite ends thereof; charging element module groups arranged by laterally aligning the charging element modules in parallel; a built-up construction of the charging element modules arranged by building-up the charging element module groups in several stages; bus bar plates disposed at the opposite ends of the built-up construction of charging element modules and fitted to the terminals; bus bars disposed outside the bus bar plate and serially connecting the terminals; a housing in which cooling air flows and the built-up construction of the charging element modules is contained; and mounting plates having a securing ring for holding and securing the insulating ring, the mounting plate being provided below the lowermost charging element module group, above the uppermost charging element module group, and between the intermediate charging element module groups; wherein the mounting plates are integrally bound so as to hold and secure the insulating ring by the securing ribs; a restriction arrangement for rotation of the insulating ring is provided to the insulating ring and the securing rib.

According to the invention, the insulating ring held by the cells is held and secured by the securing ribs of the mounting plates, so that the intermediate portion of the charging element module is supported by the mounting plates. Therefore, vibration and bending of the module are restrained, and the load exerted on the opposite securing portions of the bus bar plates is reduced. As a result, the securing strength is increased and the weight of the charging element module is reduced. Furthermore, the rotation of the insulating ring is restricted, so that the necessary securing strength for the insulating ring by the mounting plates can be reduced, and the weight can be further reduced.

According to a preferred embodiment of the invention, the mounting plate includes rectifying plates disposed between the charging element modules and extending along an axial direction of the charging element modules, whereby cooling air passes through the interval of the rectifying plates and flows in the built-up direction of the charging element modules. The built-up construction of charging element modules has an upper surface and a lower surface, one of which serves as a cooling air inlet surface, the built-up construction of charging element modules is inclined so that the cooling air inlet surface faces toward the upstream of the cooling air.

The rectifying plates are provided to the mounting plate so that the both elements can be integrally formed, and the assembly can be simplified and assembling efficiency can be increased. By inclining the built-up construction of charging element modules, fresh cooling air comes directly into contact with the entire surface of a cooling air inlet surface provided to the built-up construction of charging element modules, the cooling air flows from the inlet surface toward the built-up direction of the built-up construction of charging element modules during passing through the rectifying plates. Therefore, the flow rate and the flow velocity of the cooling air flowing the axial direction and the built-up direction of each charging element module can be even, and as a result, the charging element modules are evenly cooled and the charging and discharging efficiency and the service life thereof can be increased.

It should be noted that the number of the stages of the charging element module groups may be less than the number of the charging element modules comprising the charging element module group. Such an arrangement can promote the cooling efficiency and reduce the number of the mounting plates.

In order to avoid misassembly in connecting terminals with different polarities by the bus bar, the following arrangements are preferable.

The charging element module may have opposite polarities in the terminals, four protrusions are formed along a concentric circle on the terminals, an end of the bus bar is fitted into the inside of the protrusions, the phase of the protrusions on the terminal with the polarity is offset from the phase of the protrusions on the terminal with the other polarity, so that one protrusion is positioned at an extending portion of the bus bar. The diameters of the concentric circles may be different from each other. The bus bar may include a hole which receives one protrusion so as to allow the connection of the terminals by the bus bar.

By the above arrangements, the bus bar can be fitted to only the regular terminals, so that misassembly can be completely avoided. The protrusion supports the torque and serves as a stopper against the rotation when the bus bar is secured by a bolt, and the operation efficiency thereof can be increased.

Another aspect of the invention provides a charging element device comprising: columnar charging element modules arranged by serially connecting cylindrical cells via an insulating ring, the module having a terminal at opposite ends thereof; charging element module groups arranged by laterally aligning the charging element modules in parallel; bus bar plates disposed at the opposite ends of the built-up construction of charging element modules and fitted to the terminals; bus bars disposed outside the bus bar plate and serially connecting the terminals; a housing in which cooling air flows and the built-up construction of the charging element modules is contained; and mounting plates disposed apart from each other in an axial direction of the charging element module, the mounting plates being arranged such that the charging element modules are inserted thereinto and are circumferentially aligned to form the charging element module group; holding and securing the insulating ring, the mounting plate being provided below the lowermost charging element module group, above the uppermost charging element module group, and between the intermediate charging element module groups; a cooling air path disposed in a radially inner portion or a radially outer portion of the charging element module group; wherein the mounting plate has securing ribs for fitting and securing the insulating rings, and a restriction arrangement for rotation of the insulating ring is provided to the insulating ring and the securing rib.

According to the invention, cooling air flows in the radial inside or outside of the charging element module group which is circumferentially aligned, so that the fresh cooling air can contact along the entire length of the charging element modules. Therefore, the charging element modules are evenly cooled, and the charging and discharging efficiency and the service life can be increased.

Moreover, the insulating ring held by the cells is fitted and secured by the securing ribs of the mounting plates, so that the intermediate portion of the charging element module is supported by the mounting plates. Therefore, vibration and bending of the module are restrained, and the load exerted on the opposite securing portions of the bus bar plates is reduced. As a result, the securing strength is increased and the weight of the charging element module is reduced. Furthermore, the rotation of the insulating ring is restricted, so that the necessary securing strength for the insulating ring by the mounting plates can be reduced, and the weight can be further reduced.

In the invention, in order to circumferentially align and connect the terminals by bus bars and to avoid misassembly in connecting the terminals by the bus bar, the following arrangements are preferable.

The charging element module may have opposite polarities in the terminals, and four protrusions may be formed along a concentric circle on the terminals. An end of the bus bar may be fitted into the inside of the protrusions, the phase of the protrusions on the terminal with the polarity may be offset by $K°$ which is calculated by the following equation (1) in which the number of the charging element modules is defined as "H", from the phase of the protrusions on the terminal with the other polarity, so that one protrusion is positioned at an extending portion of the bus bar.

$$360/H=K \quad (1)$$

The diameters of the concentric circles may be different from each other. Furthermore, the bus bar may include a hole which receives the one protrusion so as to allow the connection of the terminals by the bus bar. On the other hand, the bus bar may be formed with a hole into which the protrusion is fitted to allow connecting of the terminals by the bus bar.

Preferred embodiments which can be applied to the first and second aspects of the invention will be explained hereinafter.

The device may comprise a connecting ring serially connecting the charging elements, the connecting ring is fitted to the insulating ring and an outer package of the charging element, which has one polarity thereof, and contacts the other charging element. The connecting ring and the insulating ring may have a positioning arrangement for circumferentially positioning the relative location thereof The insulating ring may cover at least a portion of an outer surface of the connecting ring.

In a charging element module, the designs of the terminals with different polarities will usually be differed from each other to avoid misassembly in which the same polarities are connected. In the above embodiment, by connecting the charging elements during positioning the insulating ring and the connecting ring by the positioning arrangement, a charging element module in which the relative circumferential positions of the opposite terminals are constant can be formed. By using such charging element modules, the bus bar can be smoothly fitted to the terminals. Moreover, the insulating ring covering at least a portion of the outer surface of the connecting ring radially projects from the connecting ring. Therefore, the securing rib and the mounting plates can be formed from non-insulating materials, and materials having superior strength-weight ratios and rigidity-weight ratios, such as high-strength magnesium alloys and high-rigidity aluminum alloys, can be used, so that the weight can be further reduced.

The charging element module may have opposite polarities in the terminals, the terminal with one polarity may have a cross section different from that of the terminal with the other polarity, and the terminal may have a connecting portion at the center thereof. The bus bar plate may have holes for corresponding and fitting to the terminals, and the bus bar plate may be assembled with the charging element modules by corresponding and fitting the holes to the terminals.

In the charging element device of the invention, a pair of terminals with different polarities of adjoined charging element modules are serially connected. By forming the terminals into protruded shapes with different cross sections, the difference can be easily distinguished, so that misconnection in which the same polarities are connected can be prevented. By forming holes corresponding the terminals in the bus bar plates and fitting the terminals thereto, misconnection of the bus bar plate can be avoided and the assembly can smoothly performed.

In order to form the cross sections of the terminals with different polarities, the positive terminal and the negative terminal may have a cross section with approximately a star-shape or a circular cross section. By this arrangement, the difference of the polarities is apparent and can be easily distinguished.

DETAILED DESCRIPTION OF THE INVENTION

The invention will be explained in more detail hereinafter with reference to the drawings.

1. First Embodiment

Figure 1:
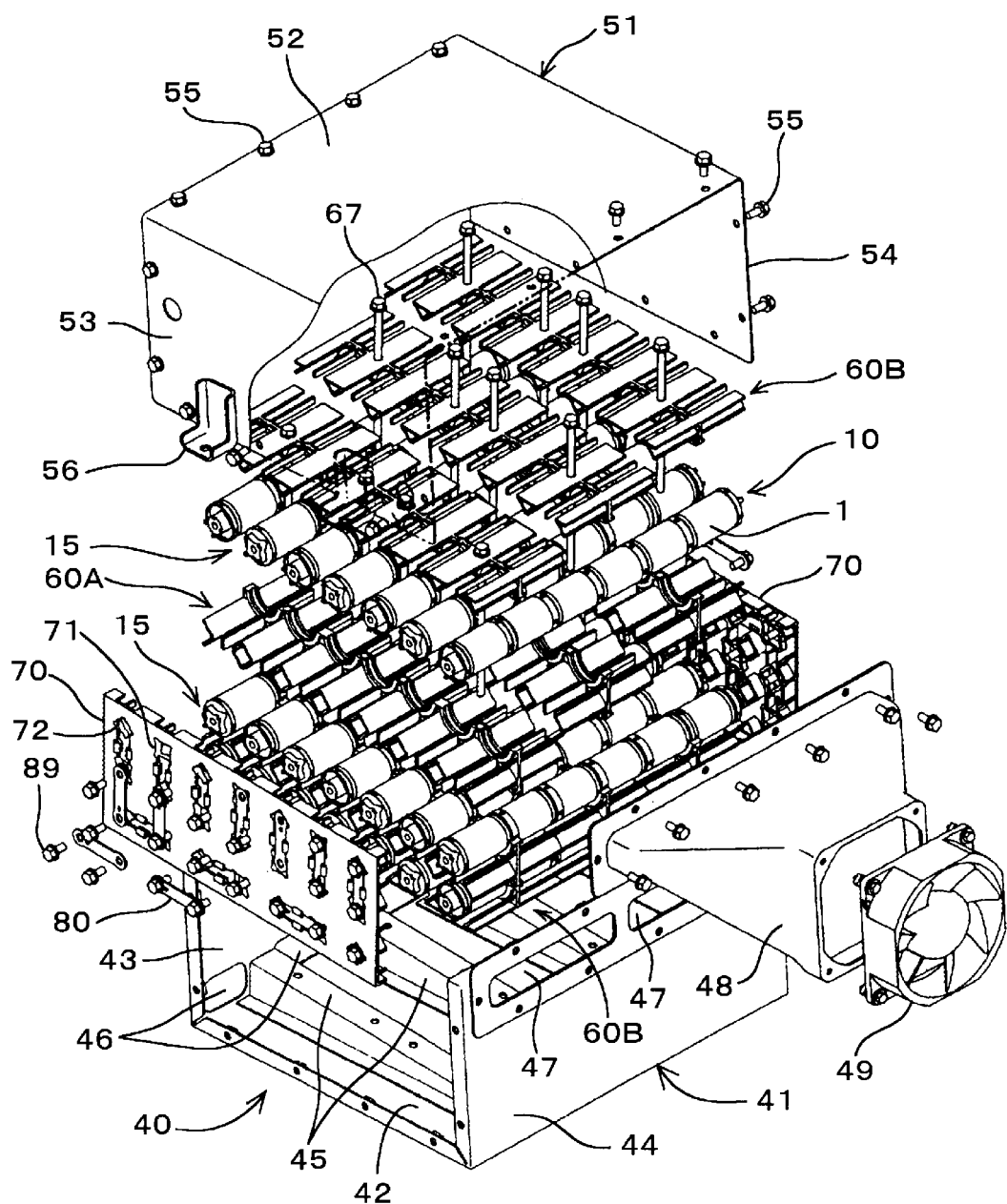
FIG. 1 is an exploded perspective view of a battery device according to a first embodiment of the invention.
Figure 2:
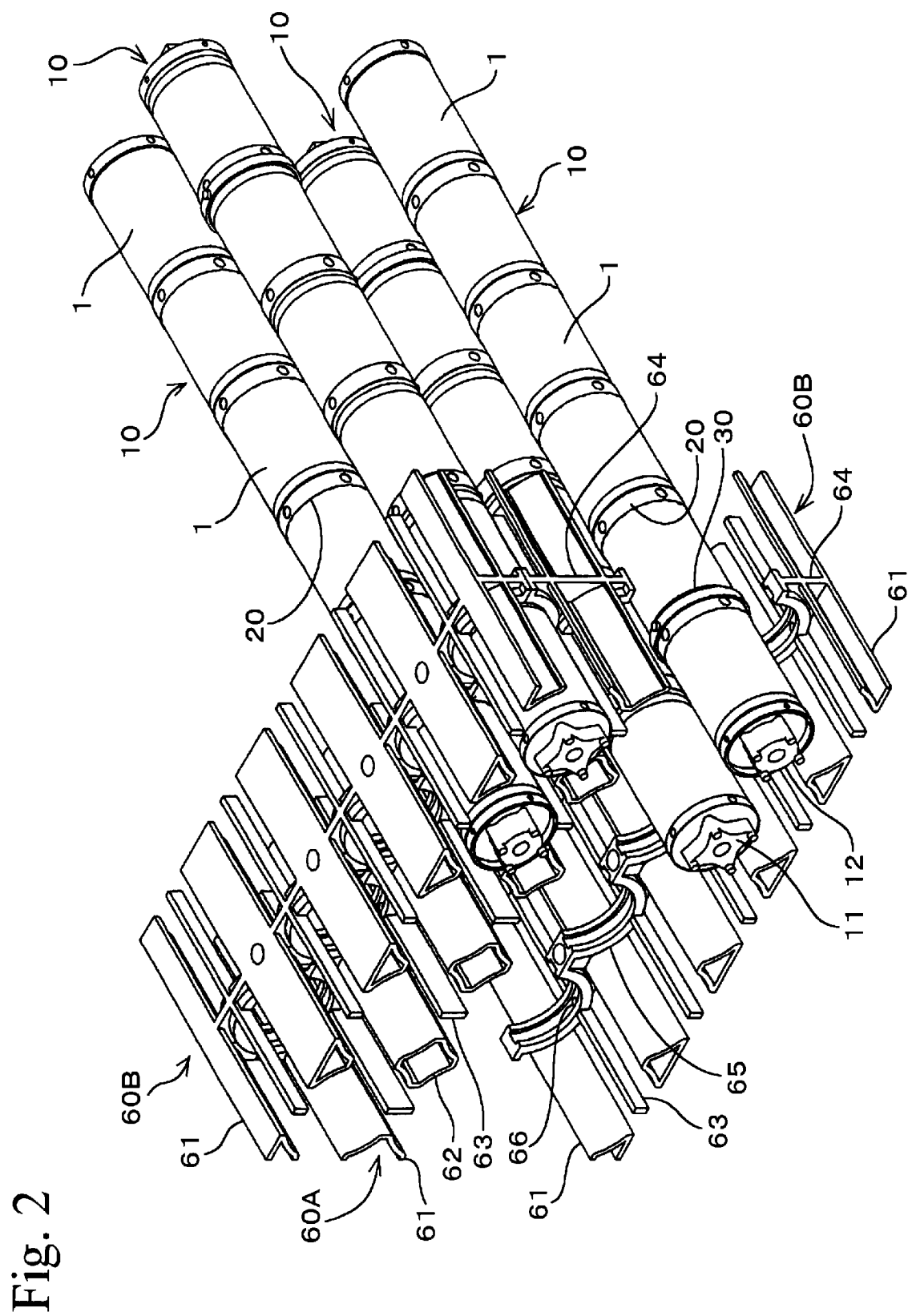
FIG. 2 is a schematic perspective view of a built-up construction of battery modules according to the first embodiment of the invention.

FIG. 1 is an exploded perspective view of a battery device according to the first embodiment of the invention. The battery device may be mounted in electric cars and hybrid electric cars to provide driving power. The battery device is designed such that plural columnar battery modules 10 consist of plural cylindrical cells are laterally aligned and are built-up in several stages, are contained in a housing 40, and are serially connected to each other. FIG. 2 is a schematic perspective view showing a built-up construction of the battery module 10.

Figure 3:
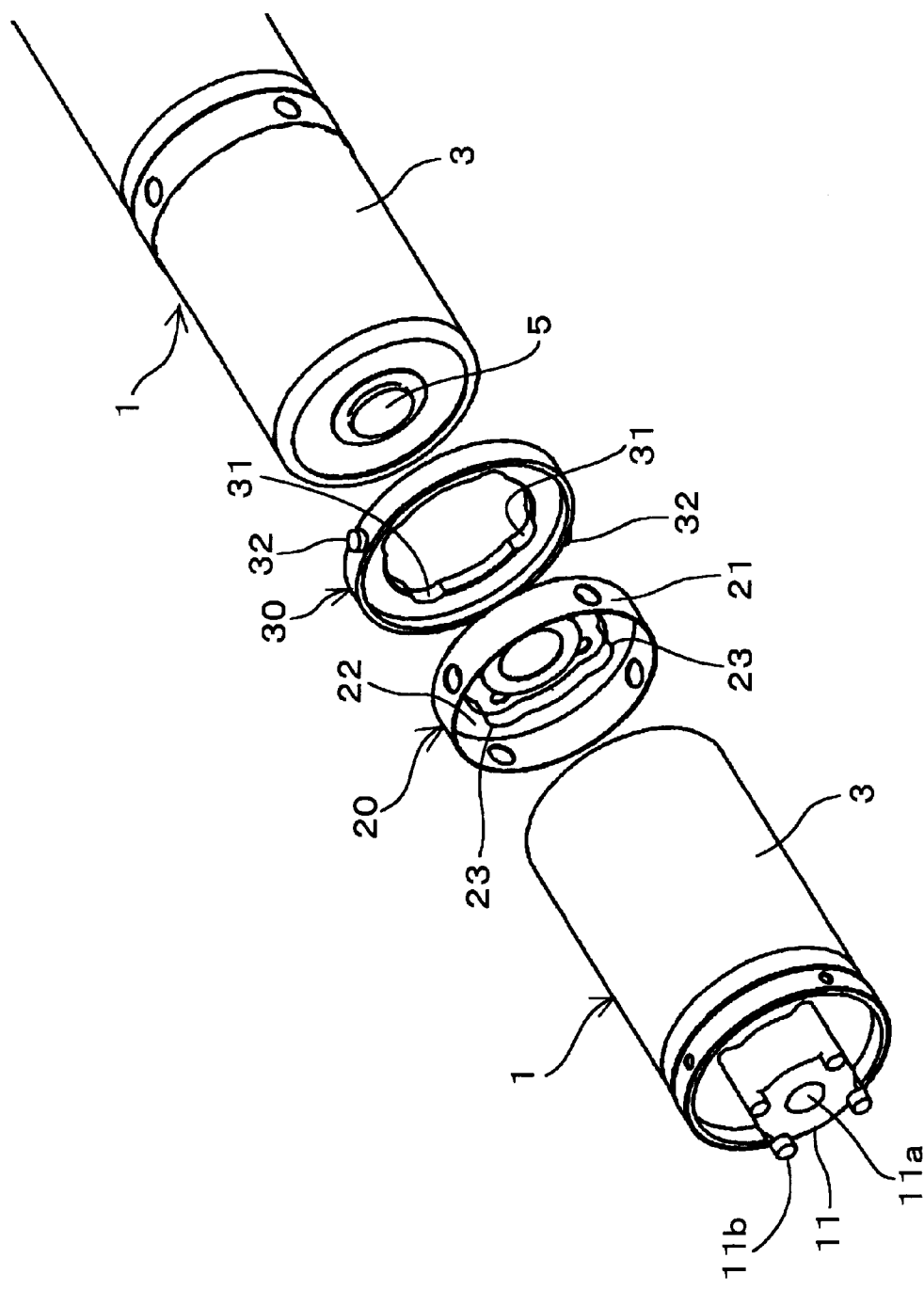
FIG. 3 is a perspective view of a connecting arrangement of cells according to the first embodiment of the invention.
Figure 4:
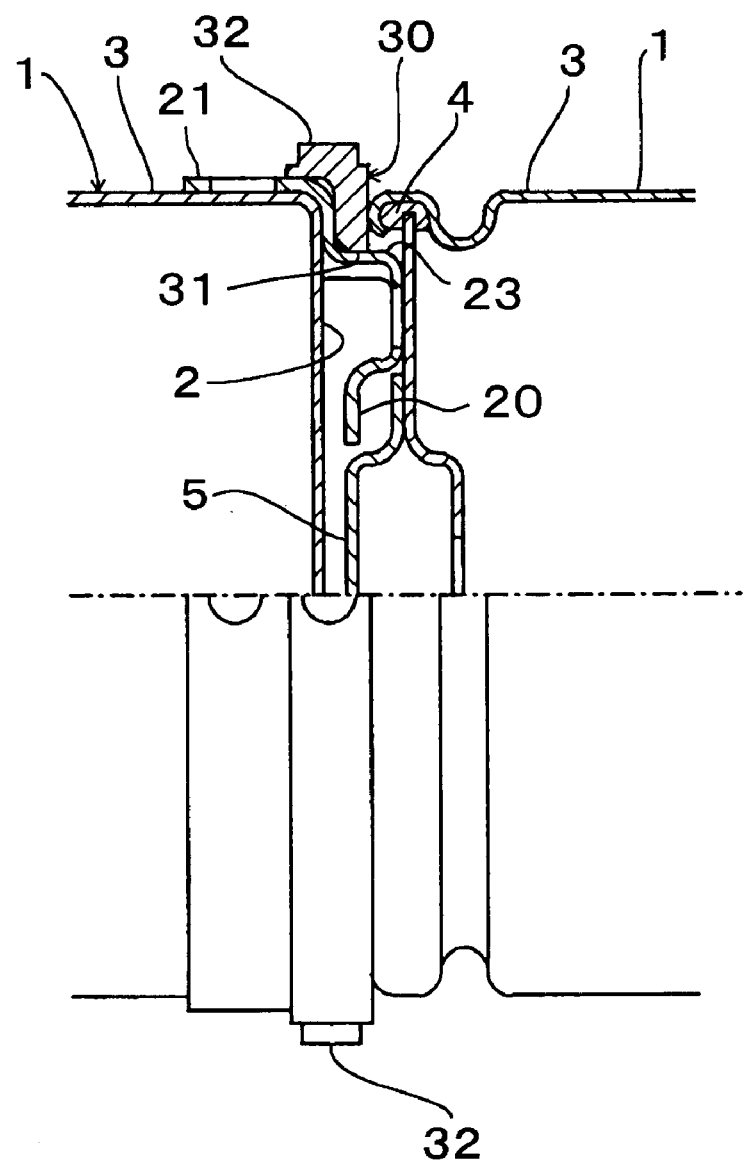
FIG. 4 is a partial cross section of a connecting arrangement of the cells according to the first embodiment of the invention.

The battery module 10 is constructed by serially connecting plural (six in the embodiment) cells 1 to each other physically and electrically. As shown in FIGS. 3 and 4, the outer surface of the cell 1 is formed by a cylindrical metallic outer package 3 serving as a negative electrode 2 at the end thereof. The opposite ends surface of the cell 1 is provided with a positive electrode 5 which is insulated from the metallic outer package 3 by a sealing member 4.

The construction for connecting cells 1 will be explained with reference to FIGS. 3 and 4.

Cells 1 are serially connected to each other via a cylindrical connecting ring 20. The connecting ring 20 comprises a cylindrical portion 21 and an end surface 22. A portion of the end surface 22 is connected to the positive electrode 5 of the cell I by spot welding, and the cylindrical portion 21 is fitted to the negative electrode 2 of another cell 1 and is connected thereto by spot welding. Thus, the cells 1 are serially connected.

An insulating ring 30 to prevent short-circuiting is held between the connecting ring 20 and the cell 1 of which positive electrode 5 is welded to the connecting ring 20. The center portion of the end surface 22 of the connecting ring 20 is projected in the axial direction, and the side portion thereof is formed with plural (four in this embodiment) arcuate protrusions 23 projecting radially. Plural concavities 31 are formed on the inner peripheral of the insulating ring 30. Each protrusion 23 is fitted into the concavity 31, so that a positioning arrangement for positioning the fitting position of the connecting ring 20 and the insulating ring 30 is provided.

The connecting of the cells 1 is performed by the following manner. First, the insulating ring 30 is fitted to the outer peripheral surface of the connecting ring 20 while the protrusion 23 of the connecting ring 20 is fitted into the concavity 31 of the insulating ring 30. Then, the end surface 22 is welded to the positive electrode 5 of the cell 1, and the negative electrode 2 of another cell 1 is then fitted to the cylindrical portion 21 of connecting ring 20 and is welded thereto. The insulating ring 30 covers a portion of the outer peripheral surface of the connecting ring 20 and projects from the outer peripheral surface as a slightly protruding joint. A pair of dowels 32 project from the outer peripheral surface of the insulating ring 30 at positions 180° apart from each other.

Figure 5A:
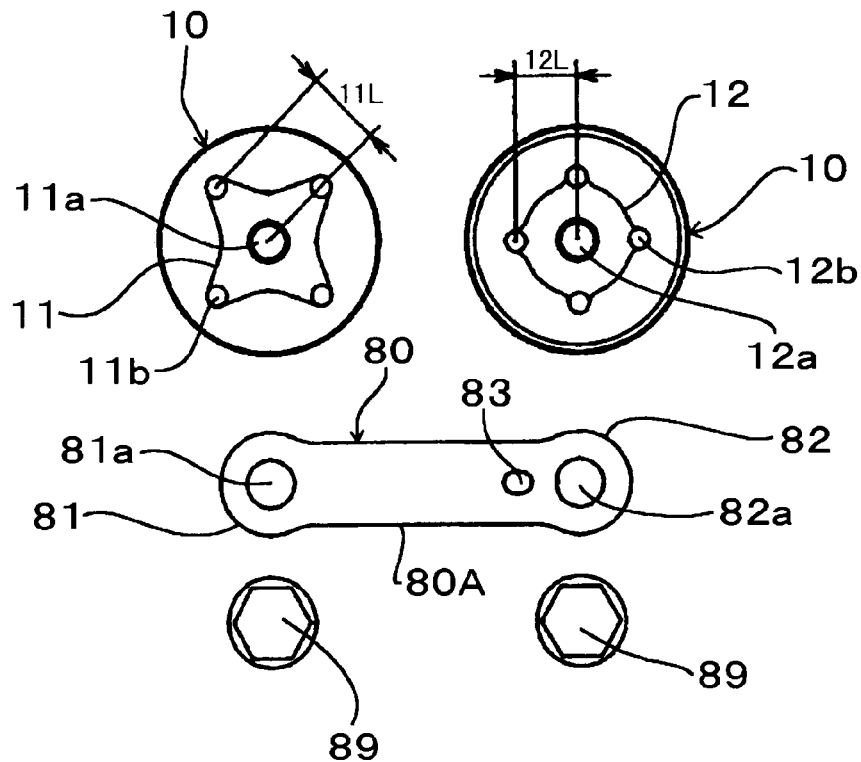
FIG. 5A is a front view of a positive terminal, a negative terminal of the battery module, and a bus bar and bolts for connecting the terminals.
Figure 5B:
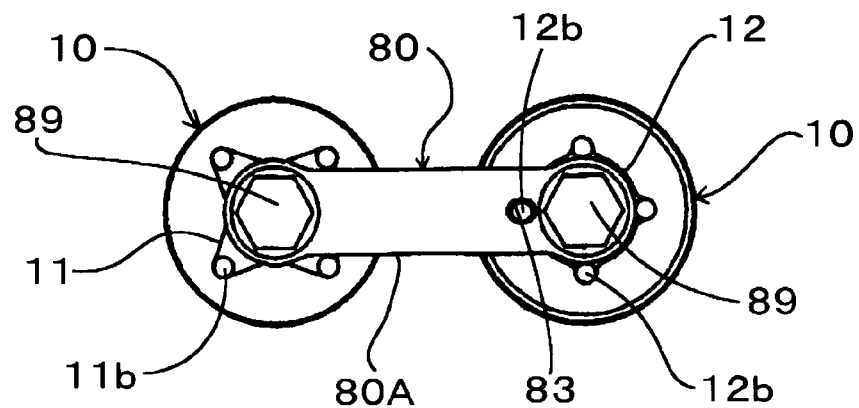
FIG. 5B is a front view showing the condition in which the positive terminal and the negative terminal are connected to each other according to the first embodiment of the invention.
Figure 6:
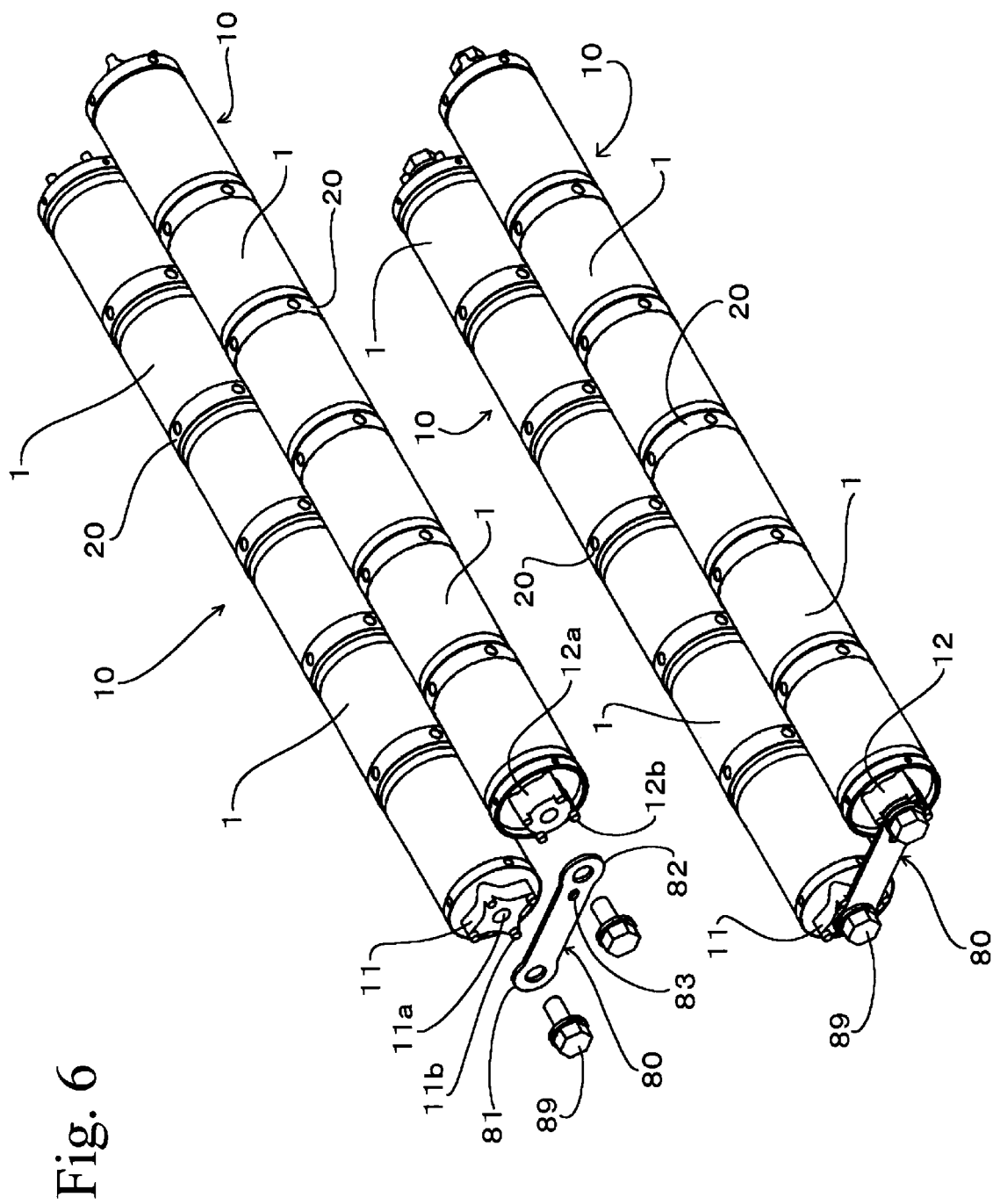
FIG. 6 is a perspective view of a connecting arrangement for terminals of the battery modules according to the first embodiment of the invention.

As shown in FIGS. 5 and 6, a positive terminal 11 and a negative terminal 12 are respectively provided at the center portion of the opposite ends of the battery module 10 in which the cells 1 are connected in the above described manner. The positive terminal 11 is a protrusion having an approximately star-shaped cross section with four sharp corners. The negative terminal 12 is a protrusion having an approximately circular cross section. Screw holes 11a and 12a are formed at the center of the terminals 11 and 12, respectively. A protrusion 11b having a circular cross section is formed just at the inside of four sharp corners of the positive terminal 11. Four similar protrusions 12b are formed at the circumference of the negative terminal 12. The protrusions 11b and 12b are arranged on a concentric circle around the screw holes 11a and 12a at the same distance in the circumferential direction. The distance 11L between the center of the screw hole 11a of the positive terminal 11 and the protrusion 11b is greater than the distance 12L between the center of the screw hole 12a of the negative terminal 12 shown in FIG. 5A.

In the condition in which the protrusion 23 of the connecting ring 20 is fitted into the concavity 31 of the insulating ring 30 in one battery module 10, the circumferential phase of the protrusion 11b of the positive terminal 11 is offset from the phase of the protrusion 12b of the negative terminal 12 by 45°.

The housing 40 in which the plural battery modules 10 are built-up and contained therein will be explained. As shown in FIG. 1, the housing 40 consists of a housing body 41 formed as a rectangular box and a cover 51.

The housing body 41 comprises a bottom plate 42 and a pair of side plates 43 and 44 facing to each other, and has a C-shaped cross section. Plural rib frames 45 extending between the side plates 43 and 44 are provided to the bottom plate 42 in parallel at the same distance. The frame 45 has an upper surface which inclines downwardly from the side plate 43 toward the side plate 44. Plural cooling air inlets 46 are formed at the lower portion of the side plate 43 in which side the frame 45 has the higher upper surface. In contrast, plural cooling air drawing portions 47 are formed at the upper outer portion of the side plate 44 at which side the frame 45 has the lower upper surface. An air duct 48 communicated to the cooling air drawing portion 47 is bolted to the upper outer portion of the side plate 44. A cooling fan 49 is provided at the end of the air duct 48 for drawing in cooling air and exhaust thereof to the outside of the housing 40.

The cover 51 comprises a top plate 52 and a pair of side plates 53 and 44 closing the opening of the side surfaces of the housing 40, and has a C-shaped cross section. The cover 51 is put over the housing 41 and is secured thereto by bolts 55. A bracket 56 is attached to the side plates 53 and 54 for mounting the battery device in vehicle.

The built-up construction of the battery module 10 in the housing will be explained hereinafter.

Seven battery modules 10 of the embodiment are laterally aligned to form a battery module group 15, and three battery module groups are built-up on the frame 45 to construct a built-up construction of battery modules 16. In FIG. 2, the battery modules 10 are aligned in five rows and two stages to simplify the drawing. The battery modules 10 are aligned as the battery module groups 15 and the built-up construction of battery modules 16 by using two kinds of plural mounting plates 60A and 60B shown in FIGS. 2, 7, and 8.

The mounting plate 60A is put between the battery module groups 15, and it comprises: rectifying endplates 61 disposed at the opposite ends in the aligned direction of the battery modules 10; intermediate rectifying plates 62 and slender partition plates 63 that are disposed between the rectifying endplates 61 and are alternatingly arranged with each other; and partition walls 64 integrally connecting these plates.

The intermediate rectifying plates 62 are parallel with each other, and have an approximately square cross section, of which diagonal lines are respectively parallel and perpendicular to the aligned direction. The rectifying endplate 61 has a configuration in which the intermediate rectifying plate 62 is horizontally divided in half along the vertical center plane thereof, and it has a recessed inner surface. The rectifying endplates 61 face the recessed inner surface outside and are aligned in parallel with the intermediate rectifying endplate 62. The partition plate 63 is aligned between the rectifying plates 61 and 62 in parallel therewith. The rectifying plates 61 and 62 and the partition plate 63 have the same length, and they are aligned in parallel with each other at the same distance so that the both ends thereof coincide. The partition wall 64 is approximately rectangular and extends in the aligning direction of the battery modules 10. The partition wall 64 is connected to the rectifying plates 61 and 62 and the partition plates 63 at the longitudinal center portion thereof and is arranged perpendicular to them. In other words, the rectifying plates 61 and 62 and the partition plate 63 are integrally formed with the partition wall 64 penetrating thereto.

Plural securing ribs 65 are provided at the upper edge or lower edge of the partition wall 64. The securing rib 65 supports each battery module 10 of the battery module group 15. The securing rib 65 is formed as a semicircle so as to hold the insulating ring 30 of the battery module 10 and is disposed between the rectifying plates 61 and 62. A hole 66 for receiving the dowel 32 of the insulating ring 30 is formed at the center of the inner surface of the securing rib 65 which holds the insulating ring 30. The dowel 32 and the hole 66 are in a restricting arrangement to stop the rotation of the insulating ring 30.

The mounting plate 60B is disposed above or below the built-up construction of battery modules 16 and has a configuration in which the mounting plate 60A is vertically divided in half along the horizontal center plane thereof. The mounting plate 60B comprises, in a manner similar to the mounting plate 60A, rectifying endplates 61, intermediate rectifying plates 62, partition plates 63, and a partition wall 64 having securing rib 65 formed with a hole 66.

The mounting plate 60A and 60B are arranged in a set of three so that rectifying plates 61 and 62 and the partition plates 63 are vertically serial, respectively. The length of the mounting plates 60A and 60B (the length along the rectifying plates 61 and 62 and partition plate 63) is identical to the length of a pair of cells 1 serially connected to each other. The securing rib 65 is disposed so as to hold the insulating ring 30 between the pair of cells 1.

The built-up construction of battery modules 16 is constructed with the mounting plates 60A and 60B in the following manner. First, three mounting plates 60B are aligned on the frames 45 of the housing body 41 so that the rectifying plates 61 and 62 and the partition plates 63 are perpendicular to the frame 45 and the securing ribs 65 face upward. Then, the insulating rings 30 at the opposite ends and the center of the battery module 10 are placed on the securing ribs 65 so as to construct lowermost battery module group 15 by aligning six battery modules 10. In this operation, the dowel 32 of the insulating ring 30 is fitted into the hole 66 of the securing rib 65 so as to position the insulating ring 30 relative to the securing rib 65. In addition, the battery modules 10 are arranged such that the positive terminal 11 and the negative terminal 12 are alternatingly adjoined. Then, three mounting plates 60A are placed on the lowermost battery module group 15, so that the insulating rings 30 are held by securing ribs 65 of the mounting plates 60A and 60B.

Figure 8:
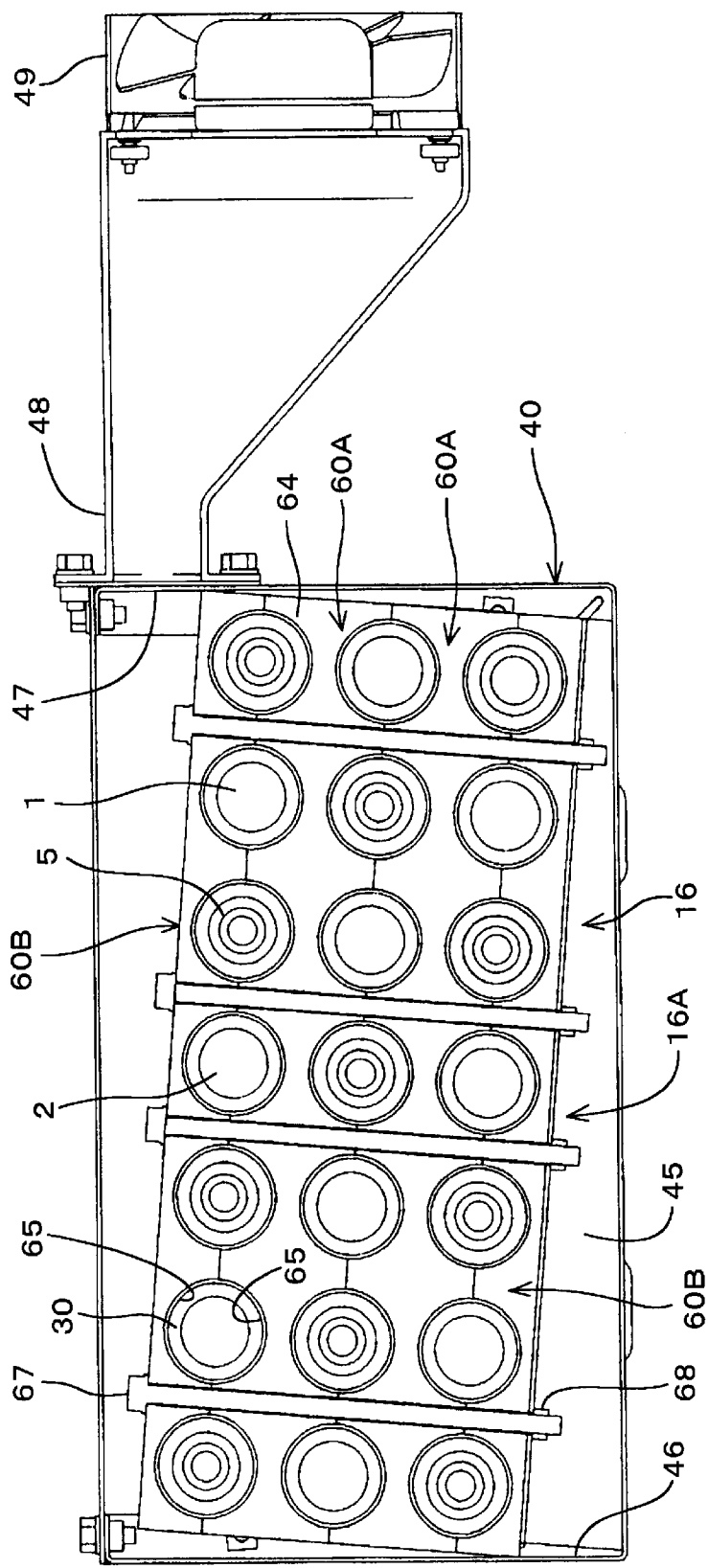
FIG. 8 is a vertical cross section mainly showing a securing arrangement of the battery modules of the battery device according to the first embodiment of the invention.

Then, the battery module group 15 of the second stage is similarly placed on the mounting plate 60A, and the mounting plate 60A and the battery module group 15 of the third stage are placed thereon in this order. The battery module groups 15 are built-up so that the polarities of laterally adjoined ones and vertically adjoined ones are different from each other. Finally, the mounting plate 60B is placed on the battery module group 15 of the third stage. When the battery module groups 15 and the mounting plates 60A and 60B are alternatingly built-up, the dowel 32 of the insulating ring 30 is fitted into the hole 66 of the securing rib 65. After building-up the battery modules 15 with the mounting plates 60A and 60B in such a manner, as shown in FIG. 8, bolts 67 are inserted through the mounting plates 60A and 60B and the frames 45 from above. The mounting plates 60A and 60B are integrally secured to the frames 45 by the bolts 67 and nuts 68.

Figure 7:
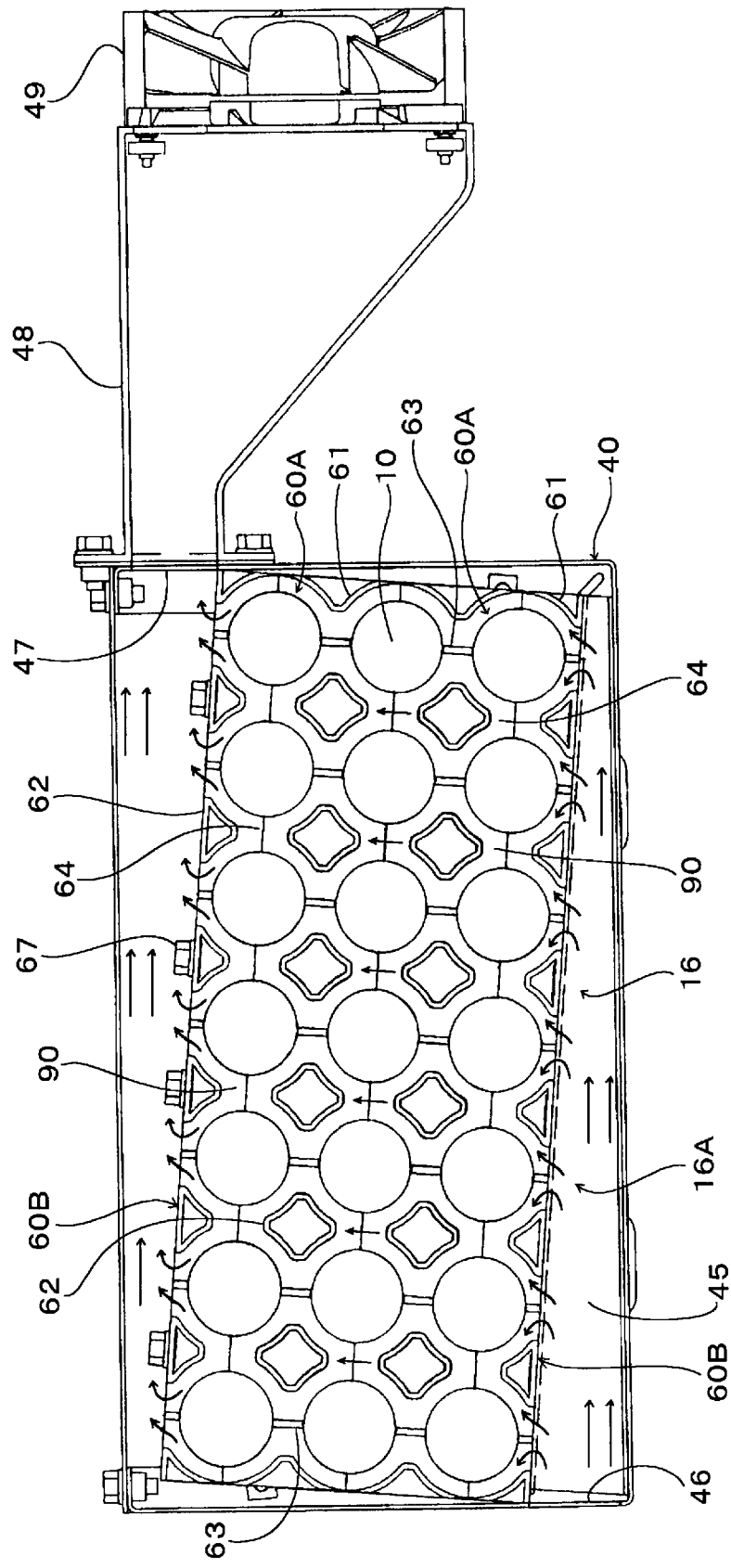
FIG. 7 is a vertical cross section mainly showing rectifying plates of the battery device according to the first embodiment of the invention.

The battery modules 10 are aligned in seven lateral rows and are built-up in three stages in the above manner. In this condition, the battery modules 10 are rigidly secured since three portions thereof are held by vertical securing ribs 65 via insulating rings 30. As shown in FIG. 7, the battery modules 10 are built-up in a squire cube pattern, and the rectifying plates 61 and 62 are evenly distributed among the battery modules 10. The surface of the rectifying plates 61 and 62, facing the battery module 10 is curved along the outer surface of the battery module 10. The vertically adjoined partition plates 63 are continuous with each other, so that the space between the laterally aligned battery modules 10 is divided into plural spaces along the vertical aligned battery modules 10. The vertically adjoined partition walls 64 are also continuous with each other, so that the space between the battery modules 10 is divided into plural spaces along the axially aligned battery modules 10. Furthermore, as is apparent from FIGS. 7 to 9, since the frames 45 are inclined, the entire built-up construction of battery modules 16 is inclined downwardly toward the air duct 48. This direction of inclination is parallel to the alignment direction of the battery modules 10. The lower surface of the built-up construction of battery modules 16 serves as the below-mentioned cooling air inlet 16A.

The dowel 32 of the insulating ring 30 is fitted into the hole 66 of the securing rib 65 as in the above manner. As a result, as shown in FIGS. 2 and 5A, four sides formed by four protrusions 11b of the positive terminal 11 appears to form a square along the alignment direction and the built-up direction of the battery module group 15. In contrast, four sides formed by four protrusions 12b of the negative terminal 12 are inclined and appear to form a diamond shape along the alignment direction of the battery module group 15. A bus bar plate 70 is respectively disposed at the opposite ends of the built-up construction of battery modules 16 and is fitted to the terminals 11 and 12. Conductive bus bar plates 80 are disposed outside of the bus bar plate 70 and connect the positive terminals 11 and the negative terminals 12.

Figure 9:
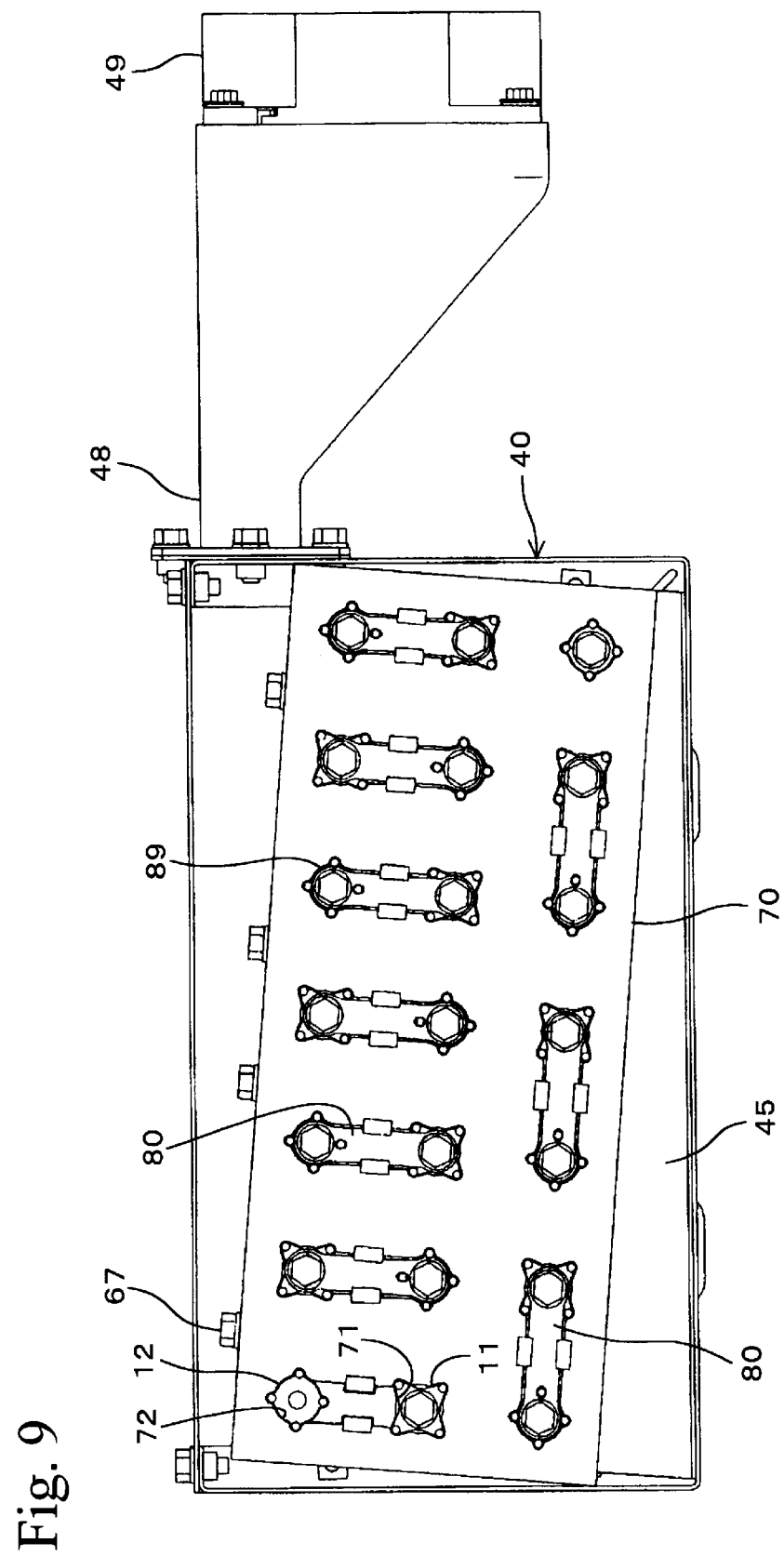
FIG. 9 is a vertical cross section mainly showing bus bars and bus bar plates of the battery device of the battery device according to the first embodiment of the invention.

As is shown in FIGS. 1 and 9, the bus bar plate 70 is a rectangular resin plate corresponding to the end surface of the built-up construction of battery modules 16. The bus bar plate 70 has positive terminal fitting holes 71 and negative terminal fitting holes 72, which fit the positive terminals 11 and the negative terminals 12 respectively by applying the plate 70 to the end surface of the built-up construction of battery modules 16. That is, the positive terminal fitting hole 71 is formed as a star-shape corresponding to the positive terminal 11, and the negative terminal 12 is formed as approximately a circle having recesses corresponding to four protrusions 12b.

As shown in FIG. 5A, the bus bar 80 is a slender plate and is formed with a positive terminal fitting portion 81 and a negative terminal fitting portion 82 at the opposite ends thereof. Each fitting portion 81 and 82 is a circle with the same diameter, the center thereof is formed with a hole 81a or 81a to insert a connecting bolt 89. The positive terminal fitting portion 81 is received within the inside of four protrusions 11b of the positive terminal 11. The negative terminal fitting portion 82 is received within the inside of four protrusions 12b of the negative terminal 12.

As shown in FIG. 5B, the bus bar 80 is bridged over the adjoined positive terminal 11 and negative terminal 12 to be connected. In the positive terminal 11, the bus bar 80 passes through between the adjoined two protrusions 11b. The distance between the protrusions 11b is determined so as to contact and fit the body 80A thereto. On the other hand, the distance between the adjoined protrusions 12b of the negative terminal 12 is smaller than that of the positive terminal 11, so that the body 80A of the bus bar 80 cannot fit thereto. A hole 83 is formed at the body 80A of the bus bar 80 in the vicinity of the negative terminal fitting portion 82. The protrusion 12b along the body 80A is inserted into the hole 83. The hole 83 is formed to be long in consideration of the tolerance between the terminals 11 and 12.

The bus bar plate 70 and the bus bar 80 connect and secure the ends of the battery module 10, and serially connect the terminals 11 and 12 in the following manner. That is, the bus bar plate 70 is first applied to the opposite ends of the built-up construction of battery modules 16, and the positive terminal fitting hole 71 is fitted to the corresponding positive terminal 11, and the negative terminal fitting hole 72 is fitted to the corresponding negative terminal 12. Then, as shown FIG. 5B and lower portion of FIG. 6 (the bus bar plate 70 is omitted in the figures), the bus bar 80 is bridged over the adjoined positive terminal 11 and negative terminal 12 to be connected, and the fitting portions 81 and 82 thereof are fitted to the terminals 11 and 12. The bus bar 80 and the bus bar plate 70 are both tightened by bolts 89 which are inserted through holes 81a and 82a and are screwed to the screw holes 11a and 12a. Both of the tightenings makes the bus bar plate 70 secure so that it does not shake. In order to enable two tightenings, the thickness of the bus bar plate 70 may be greater than the height of the protrusions 11b and 12b of the terminals 11 and 12.

Thus, the built-up construction of battery modules 16 is secured to the housing body 41, and the battery modules 10 are serially connected. Then, the cover 51 is put over the housing body 41 and is secured thereto by bolts 55, whereby the assembly of the battery device of the embodiment is completed. As shown in FIG. 7, the space along the alignment direction is divided into plural spaces by each partition plate 63 of the mounting plates 60A and 60B and the side plates 43 and 44 of the housing body 41. Also, the space along the axial direction of the battery module 10 is divided into plural spaces by each partition wall 64 of the mounting plates 60A and 60B and the side plates 53 and 54 of the cover 51. That is, in the inside of the housing 40, plural compartments 90 extending along the accumulating direction (vertical direction) of the battery module group 15 are constructed in a cubic pattern by the housing 40, the partition plates 63, and the partition walls 64.

The functions and advantages of the battery device will be explained hereinafter.

According to the built-up construction of the battery modules 10, the insulating ring 30 between the cells 1 is held and is rigidly secured by the securing ribs 65 of the vertical mounting plates 60A and 60B. Therefore, the intermediate portion of the battery module 10 is rigidly supported by the mounting plates 60A and 60B, and the vibration and the bending of the battery module 10 therefore can be restrained, and the load exerted on the fixed portion of the battery module 10 can be relieved. As a result, the securing strength can be increased and the weight of the device can be further reduced. Moreover, since the rotation of the insulating ring 30 is restricted by fitting the dowel 32 of the insulating ring 30 into the hole 66 of the securing rib 65, the necessary securing strength of the mounting plates 60A and 60B against the insulating ring 30 can be relieved, and the weight of the device can be further reduced.

Figure 10:
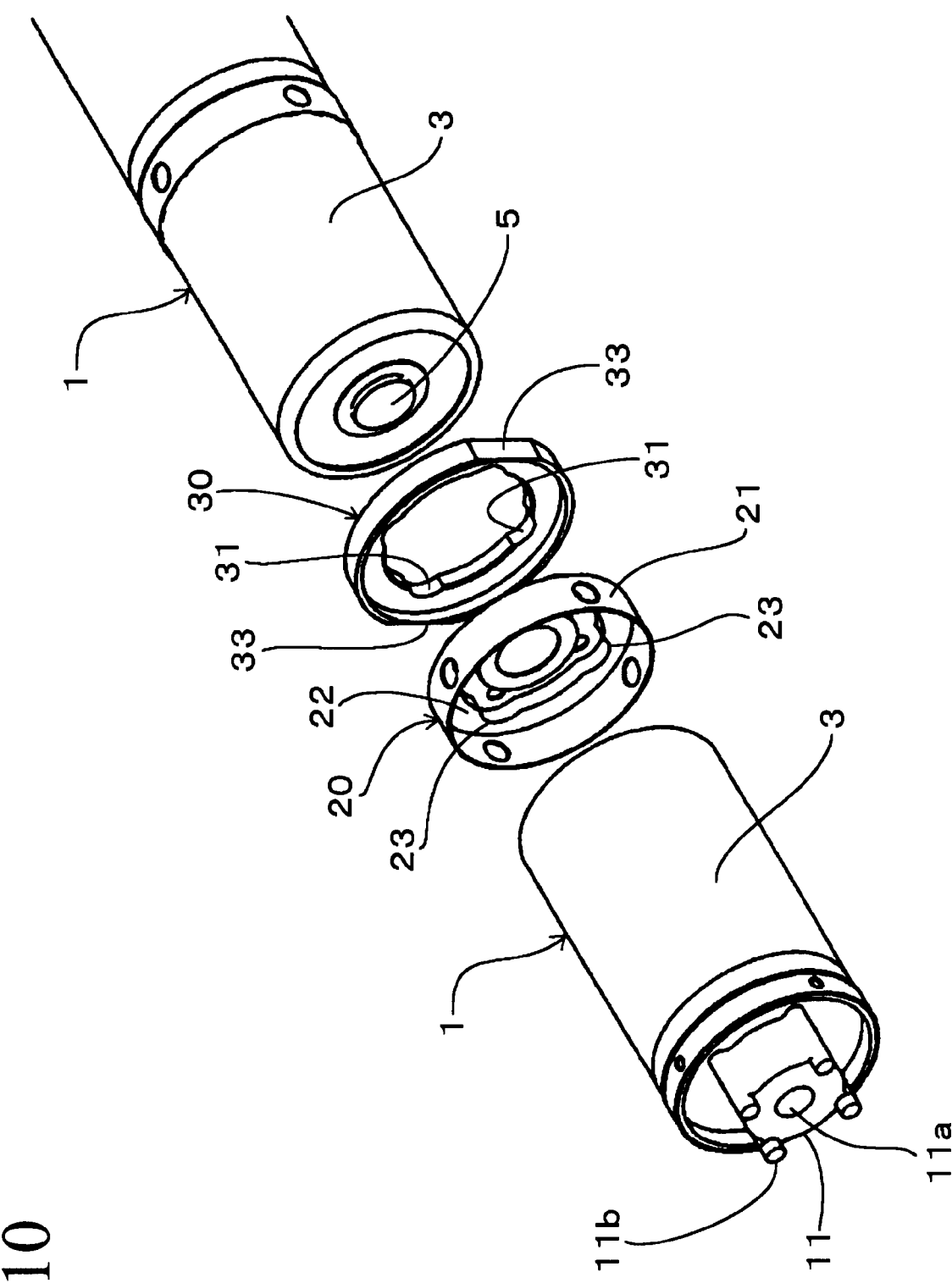
FIG. 10 is a perspective view showing an arrangement of a connecting arrangement of cells according to the first embodiment of the invention.

It should be noted that an arrangement for restricting the rotation of thew insulating ring 30 other than the above-mentioned arrangement can be applied. For example, as shown in FIG. 10, the opposite sides of the insulating ring 30 may be formed with flat faces 33, and a pair of fitting surfaces may be formed at the securing rib 65.

With respect to the arrangement of the battery module 10, since the cells 1 are connected by fitting the protrusion 23 of the connecting ring 20 into the concavity 31 of the insulating ring 30, the battery module 10 in which the circumferential positions of the opposite terminals 11 and 12 at the opposite ends are constant can be assembled. By using such battery modules 10, the bus bar plate 70 can be easily fitted to the terminals 11 and 12. Furthermore, the insulating ring 30 covers a portion of the outer surface of the connecting ring 20 and radially projects therefrom, and the securing rib 65 is fitted to the insulating ring 30, so that the securing rib 65 does not contact the connecting ring 20. Therefore, the securing rib 65 and the mounting plates 60A and 60B can be formed from non-insulating materials, and materials having superior strength-weight ratios and rigidity-weight ratios, such as high-strength magnesium alloys and high-rigidity aluminum alloys, can be used, so that the weight thereof can be further reduced.

Moreover, the positive terminal 11 of the battery module 10 is formed as approximately a star-shape which is similar to the plus symbol, and the negative terminal 12 is formed as approximately a circle which is completely different from the shape of the positive terminal 11. Therefore, the difference of the polarities is apparent and can be easily distinguished, so that misconnection in which the same polarities are connected can be prevented. In the embodiment, the positive terminal fitting hole corresponding the positive terminal 11 and the negative terminal fitting hole 72 corresponding to the negative terminal 12 are fitted to the terminals 11 and 12, so that the misassembly of the bus bar plate 70 can be avoided and the assembly thereof can be smoothly performed.

In addition, the bus bar 80 has the positive terminal fitting portion 81 which can fit to only the positive terminal 11 and the negative terminal fitting portion 82 which can fit to only the negative terminal 12, and has an arrangement in which normal connection cannot be performed other than by the hole 83 of the body 80A being fitted to the protrusion 12b in the vicinity of the negative terminal 12, and misassembly can therefore be reliably avoided. The protrusions 11b and 12b support the torque and serve as a stopper against rotation when the bus bar 80 is secured by the bolt 89, and the operation efficiency thereof can be increased.

The functions and advantages of the cooling arrangement of the embodiment will be explained hereinafter.

When the battery device operates and the cooling fan 49 starts to operate, as shown in FIG. 7, the outside air is drawn therein and flows into the housing 40 from the cooling air inlet 46 as cooling air. The cooling air flowing in directly comes into contact with all of the cooling air inlet surface 16A, which is the lower surface of the built-up construction of battery modules 16, and flows into each compartment 90. In the inlet portion of the cooling air, the space between the built-up construction of battery modules 16 and the housing body 41 becomes narrower toward the downstream, since the built-up construction of battery modules 16 is inclined. Therefore, the flow velocity of the cooling air increases toward the downstream direction. As a result, in cooperation with the cooling air coming directly into contact with the entirety of the cooling air inlet surface 16A, the flow rate of the cooling air flowing into the compartments 90 can be approximately even along the aligned direction of the battery modules 10 without deviation.

The cooling air flows upward in the compartment 90, and passes through the rectifying plates 61 and 62, and the battery modules 10 are efficiently cooled. The cooling air which has passed through the built-up construction of battery modules 16 is exhausted through the cooling air drawing portion 47 via duct 48 to the outside.

The cooling air flows along the axial direction and the built-up direction of each battery module 10 with an even flow rate and an even flow velocity, and the battery modules 10 are therefore uniformly cooled, and the charging and discharging efficiency and the service life are increased. Moreover, in the embodiment, the built-up construction of battery modules 16 consists of seven rows and three stages, and the cooling air flows in the built-up direction over a short distance, so that the cooling efficiency is further increased. This built-up arrangement can reduce the number of the intermediate mounting plates 60A.

The second embodiment of the invention will be explained with reference to FIGS. 11 and 12, and the third embodiment of the invention will be explained with reference to FIGS. 13 to 15. In these figures, the same reference numerals are applied to the same components referred to in the first embodiment, and the explanation thereof will be omitted. The first, second and third embodiments are related to the first invention.

(2) Second Embodiment

Figure 11:
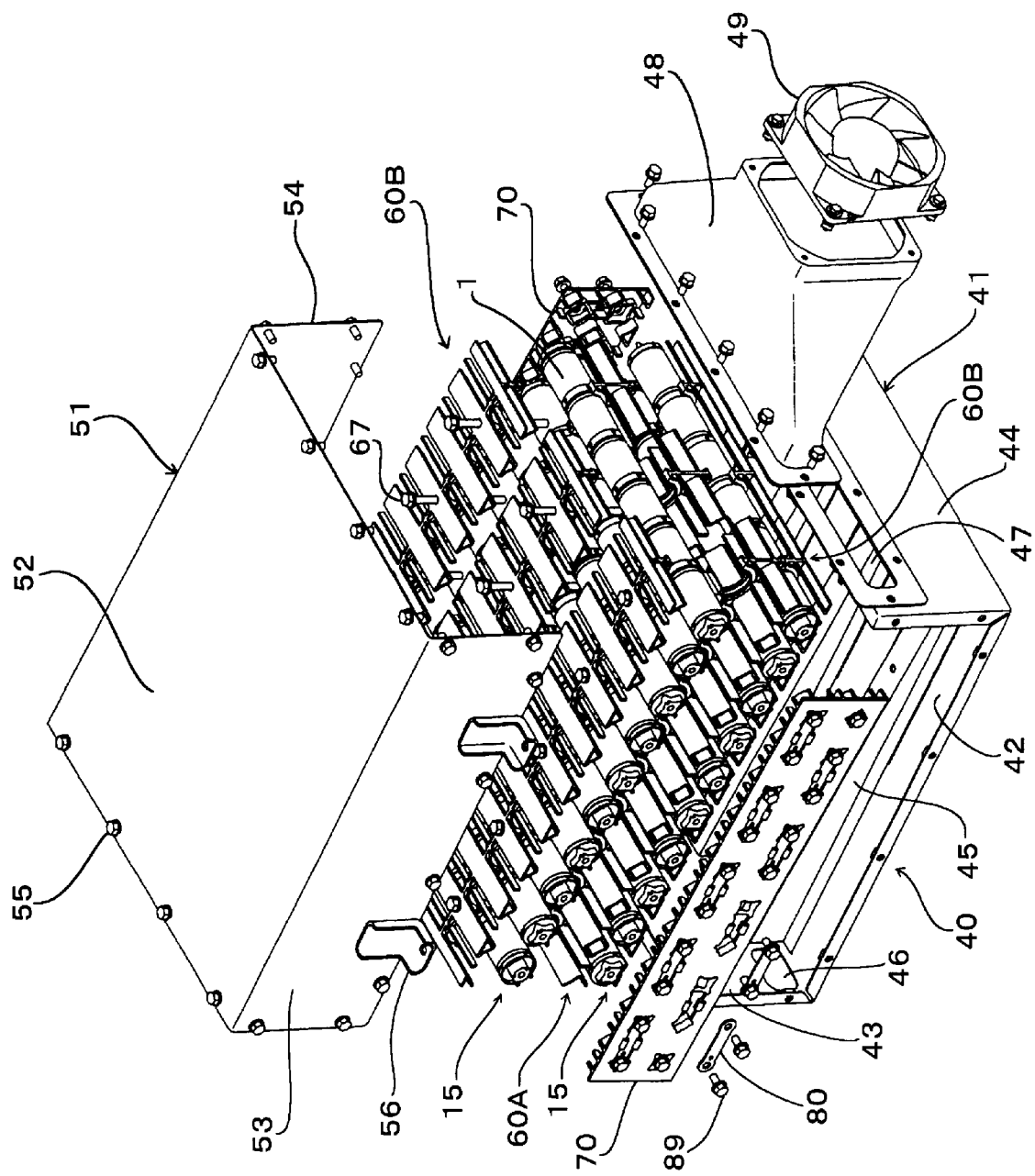
FIG. 11 is an exploded perspective view of the battery device according to a second embodiment of the invention.
Figure 12:
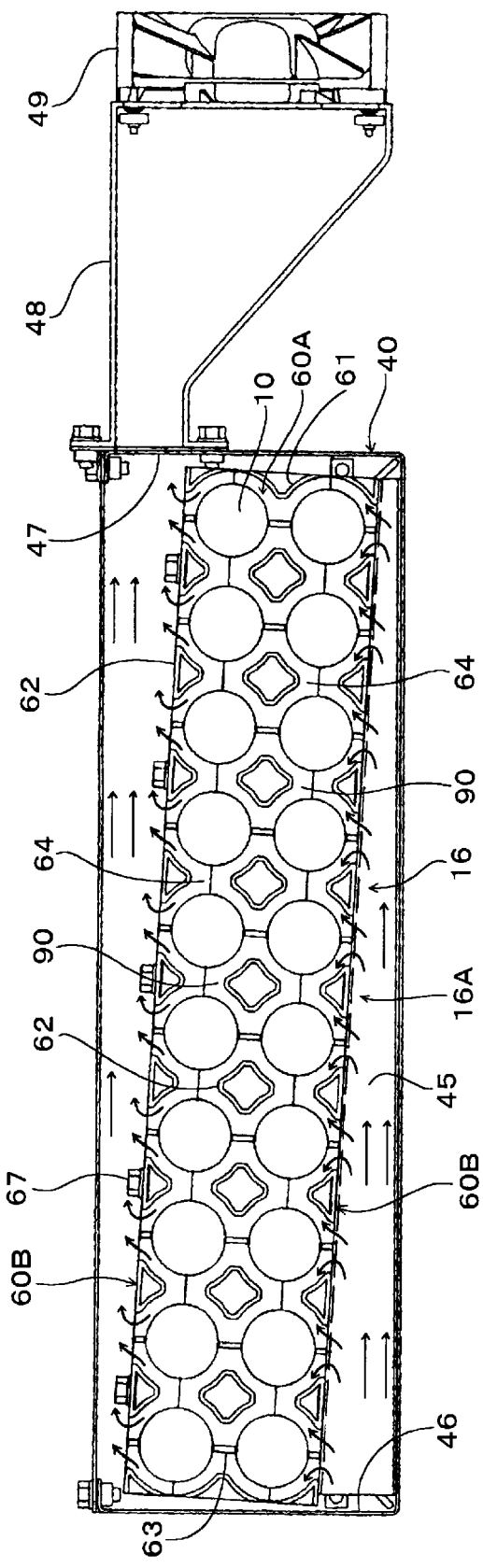
FIG. 12 is a vertical cross section mainly showing rectifying plates of the battery device according to the second embodiment of the invention.

In the second embodiment shown in FIGS. 11 and 12, the built-up construction of battery modules 16 consists of two stages of the battery module group 15 with ten rows of the battery modules 10. The arrangement in which the battery module group 15 is built-up by the mounting plates 60A and 60B and the insulating ring 30 is held and secured by the vertical securing ribs 65 is the same as in the first embodiment. As shown in FIG. 12, the arrangement in which the built-up construction of battery modules 16 are disposed inclined on the frame 45 and the cooling air comes into contact with all of the cooling air inlet surface 16A, is also the same as in the first embodiment.

According to the second embodiment, since the built-up construction of battery modules 16 consists of two stages, the cooling efficiency can be further increased, and since the total thickness is small, the device is suitable for vehicles with limited vertical space.

(3) Third Embodiment

Figure 13:
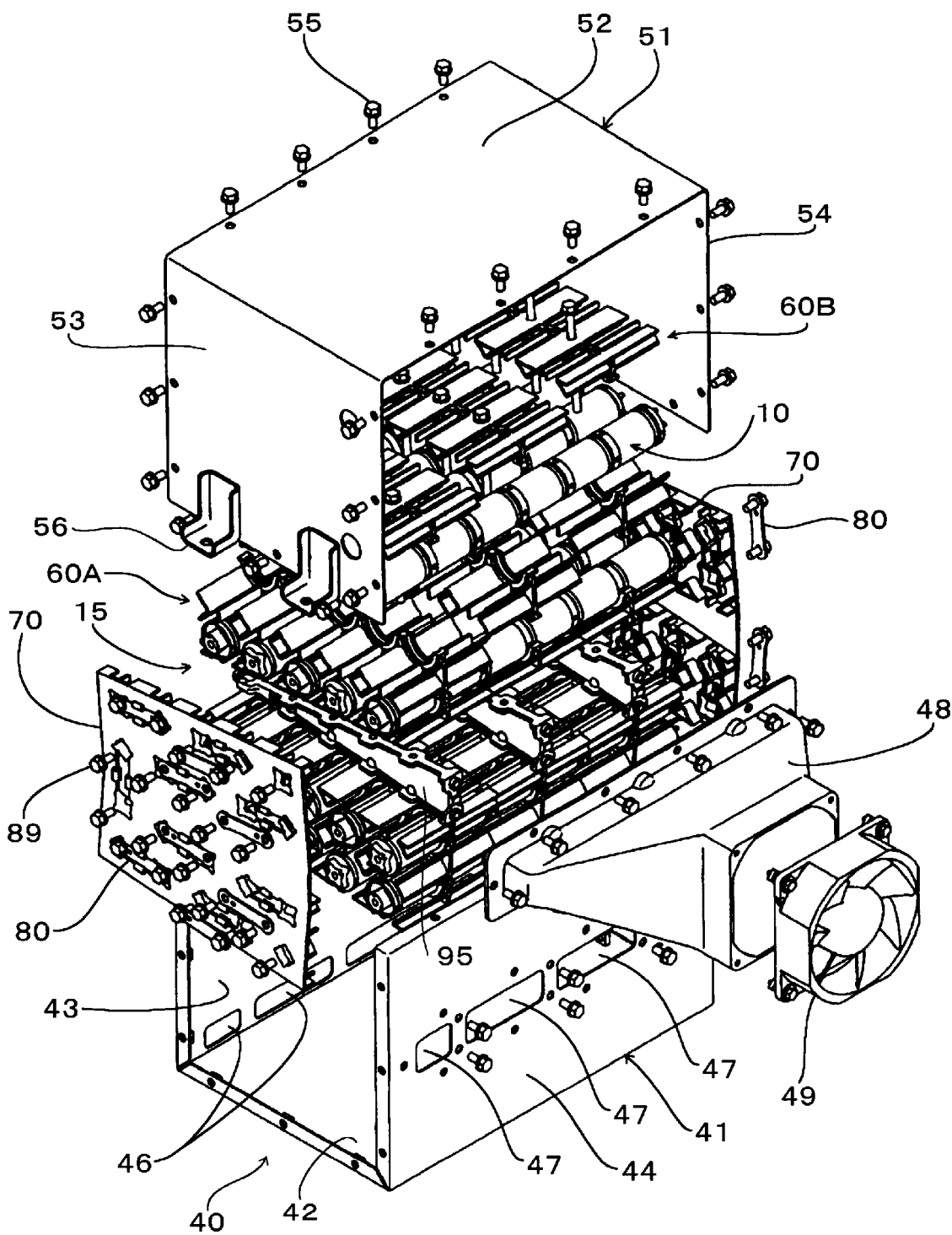
FIG. 13 is an exploded perspective view of the battery device according to a third embodiment of the invention.
Figure 14:
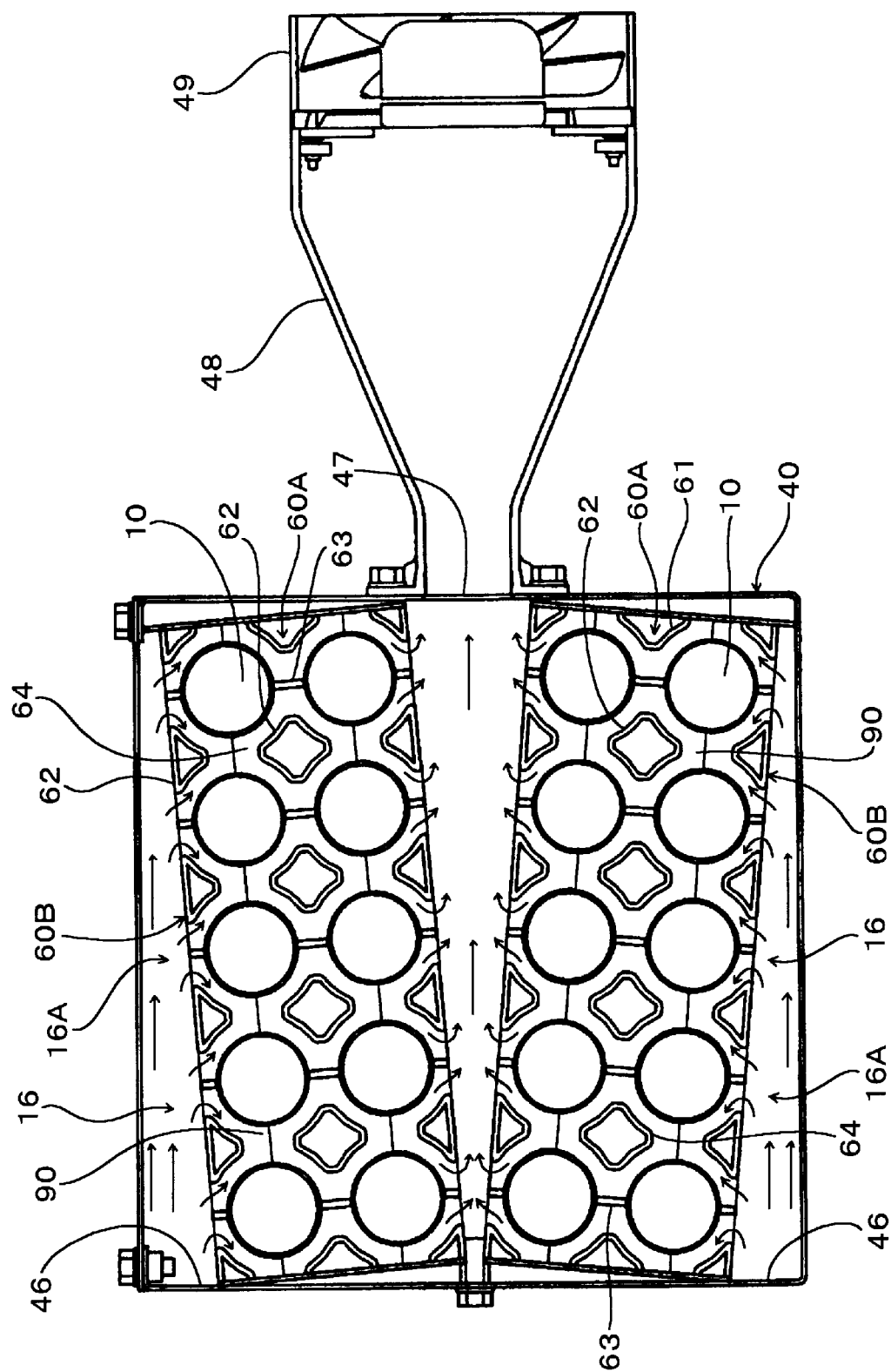
FIG. 14 is a vertical cross section mainly showing rectifying plates of the battery device according to the third embodiment of the invention.
Figure 15:
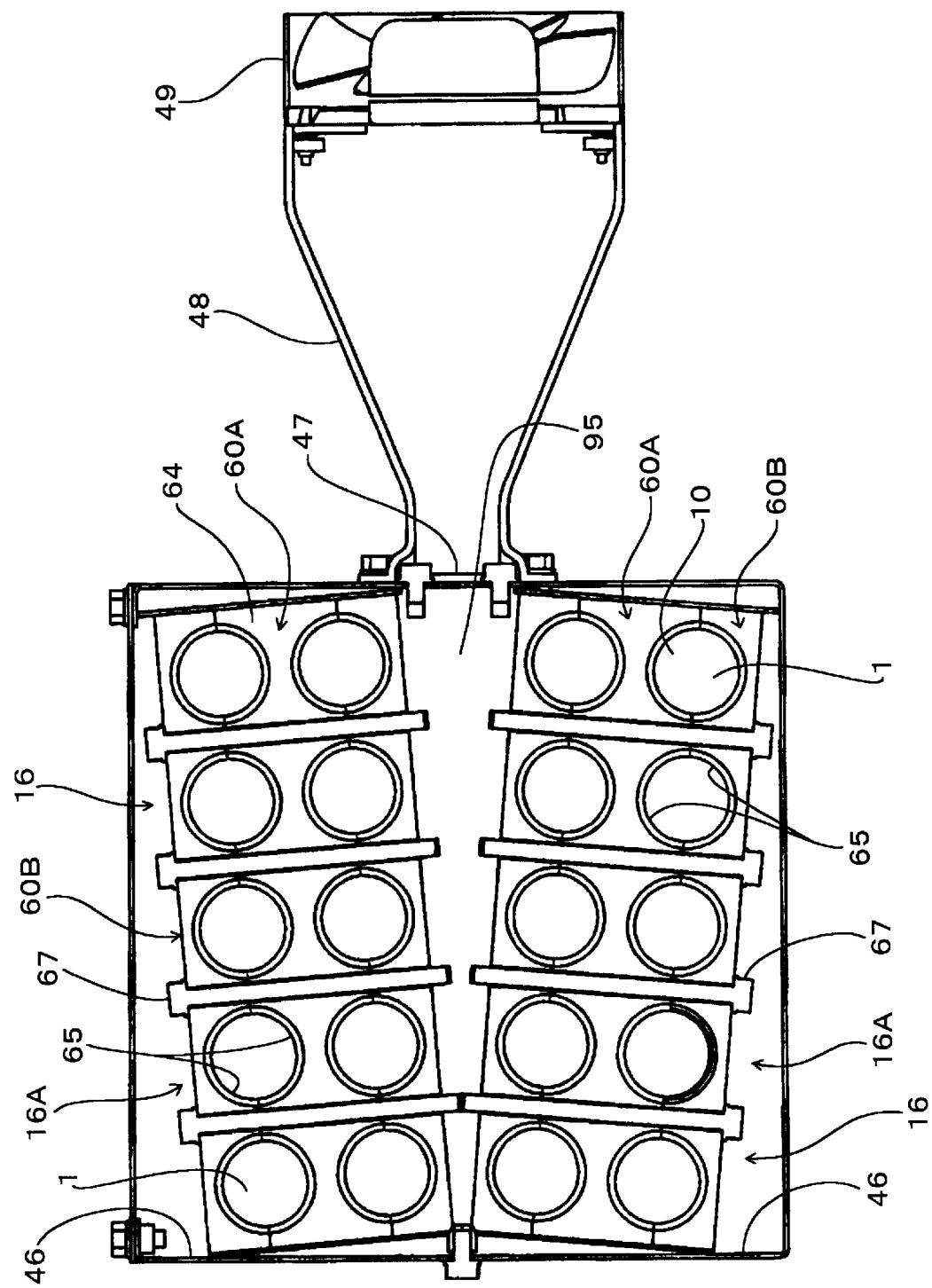
FIG. 15 is a vertical cross section mainly showing a securing arrangement of the battery modules of the battery device according to the third embodiment of the invention.

In the battery device according to the third embodiment shown in FIGS. 13 to 15, two built-up constructions of battery modules 16 with five rows and two stages are assembled in two stages. The arrangement in which the battery module group 15 is built-up by the mounting plates 60A and 60B and the insulating ring 30 is held and secured by the vertical securing ribs 65 is the same as in the first embodiment.

In the third embodiment, the cooling air inlet 46 is formed at the upper and lower portion of the side plate 43. On the other hand, the cooling air drawing portion 47 is formed at an intermediate portion of the side plate 44 in the vertical direction, and the cooling fan 49 is attached thereto. The vertical built-up constructions of battery modules 16 are secured to plural frames 95 which are disposed therebetween and are secured to the housing body 41. As shown in FIGS. 13 and 15, the frame 95 is shaped like an isosceles triangle, and the bottom line thereof is facing to the cooling air drawing portion 47. The plates 95 are bridged over the side plates 43 and 44 like a beam. The plates 95 are disposed at the portions corresponding to the securing ribs 65 of the mounting plates 60A and 60B at the same distance from each other along the axial direction of the battery module 10.

As shown in FIGS. 14 and 15, the vertical built-up constructions of battery modules 16 are apart from each other toward the cooling air drawing portion 47, the space therebetween is communicated to the cooling air drawing portion 47, and they are incline with respect to the housing body 40. In the upper built-up construction of battery modules 16, the upper surface thereof serve as the cooling air inlet surface 16A, the lower surface of the built-up construction of battery modules 16 serves as the cooling air inlet surface 16A. The bus bar plate 70 is designed to have a size and configuration so as to integrally connect the vertical built-up constructions of battery modules 16.

According to the third embodiment, as shown in FIG. 14, the cooling air flowing into the housing 40 from the upper cooling air inlet 46 comes directly into contact with the cooling air inlet surface 16A, and flows downwardly into the compartment 90. On the other hand, the cooling air flowing into the housing 40 from the lower cooling air inlet 46 comes directly into contact with the cooling air inlet surface 16A, and flows upwardly into the compartment 90. The cooling air which has respectively passed through the vertical built-up constructions of battery modules 16 merges at the space therebetween and is exhausted from the cooling air drawing portion 47 via duct 48 to the outside.

According to the third embodiment, although the vertical built-up constructions of battery modules 16 consist of four stages, both are respectively inclined and have the cooling air inlet surface 16A respectively, so that the cooling air flows substantially through two stages. Therefore, cooling efficiency can be promoted and the device can be compact.

(4) Fourth Embodiment

The fourth embodiment of the invention will be explained with reference to FIGS. 16 to 19. In the figures, the same reference numerals are applied to elements having the same functions as in first embodiment, and the explanation thereof is omitted. The fourth embodiment relates to the second aspect of the invention.

Figure 16:
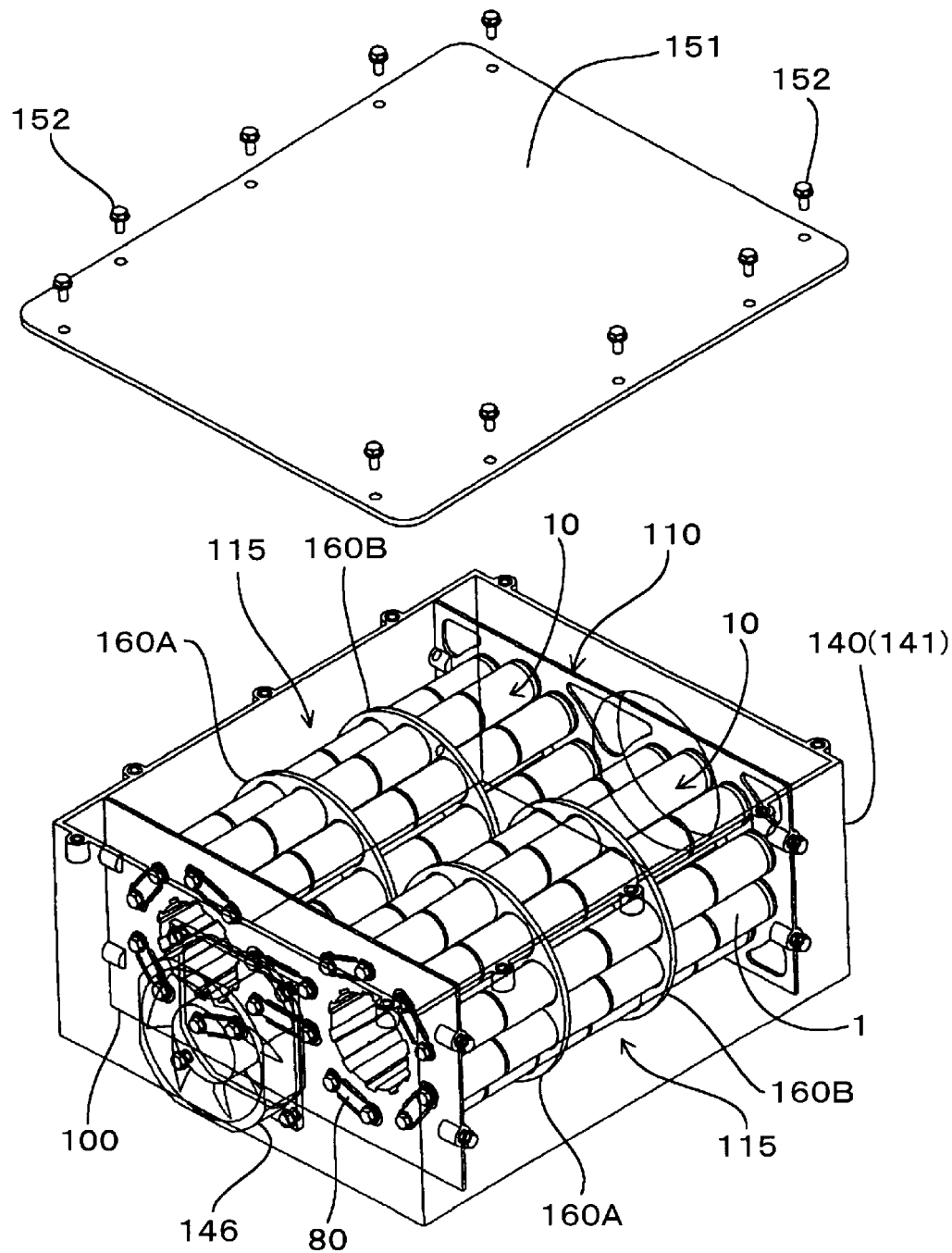
FIG. 16 is a perspective view of a battery device according to a fourth embodiment of the invention.
Figure 17:
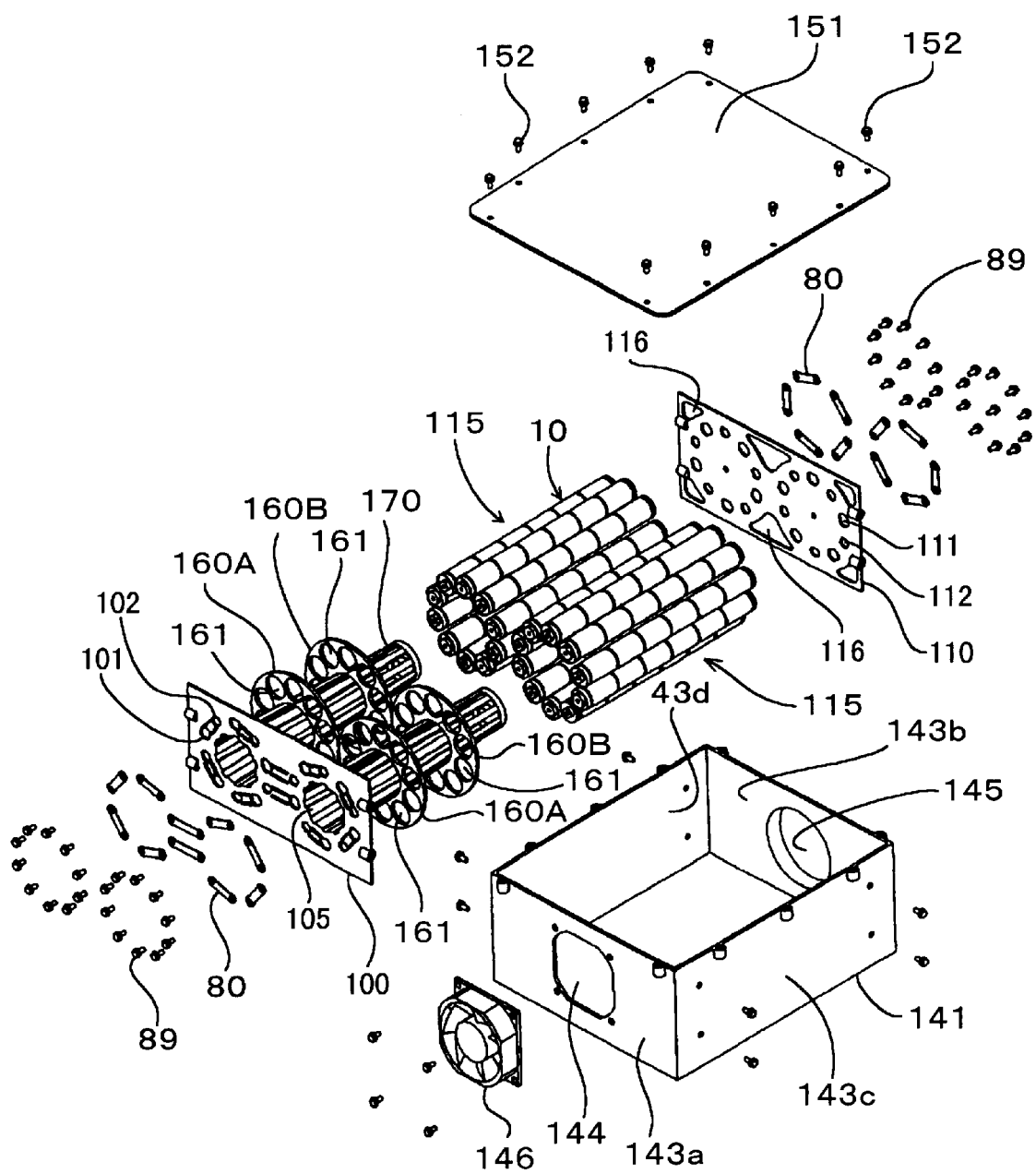
FIG. 17 is an exploded perspective view of a battery device according to the fourth embodiment of the invention.

FIG. 16 is a perspective view of the battery device of the fourth embodiment, nd FIG. 17 is an exploded perspective view of the battery device. In the fourth embodiment, plural (ten in the embodiment) battery modules 10 are aligned in parallel in the circumferential direction by the belowmentioned mounting plates 160A and 160B, so that a pair of cylindrical battery module groups 115 is constructed. Reference numeral 140 donates a housing, in which the pair of battery module groups 115 is disposed in parallel. The cells 1 are connected to each other by the arrangement shown in FIG. 10.

In the battery module 10, the protrusion 23 of the connecting ring 20 is fitted into the concavity 31 of the insulating ring 30, so that the circumferential phases of the protrusion 11b of the positive terminal 11 and the protrusion 12b of the negative terminal 12 are deviated by K° which is calculated by the following equation (1), wherein the number of the battery modules 10 comprising the battery module group 115 is defined as "H". In this arrangement, the battery module group 115 consists of ten battery modules 10, so that the circumferential phases of the protrusions 11b and 12b differ by 36°.

$$360/H=K \qquad (1)$$

Next, the housing 140 will be explained. As shown in FIGS. 16 and 17, the housing 140 substantially consists of a housing body 141 and a cover 151. The housing body 141 is a rectangular box comprising a bottom plate 142 and four side plates 143a, 143b, 143c, and 143d. The opposite side plates 143a and 143b are at the short sides of the rectangule. A cooling air inlet 144 is formed at the center of the side plate 143a, and a cooling air outlet 145 is formed at the center of the side plate 143b. A cooling fan 146 for flowing outside air into the housing 140 from the cooling air inlet 144 is provided outside of the side plate 143a. The cover 151 is a flat plate for closing the upper opening of the housing 140, and is secured to the housing body 141 by bolts 152.

Figure 18:
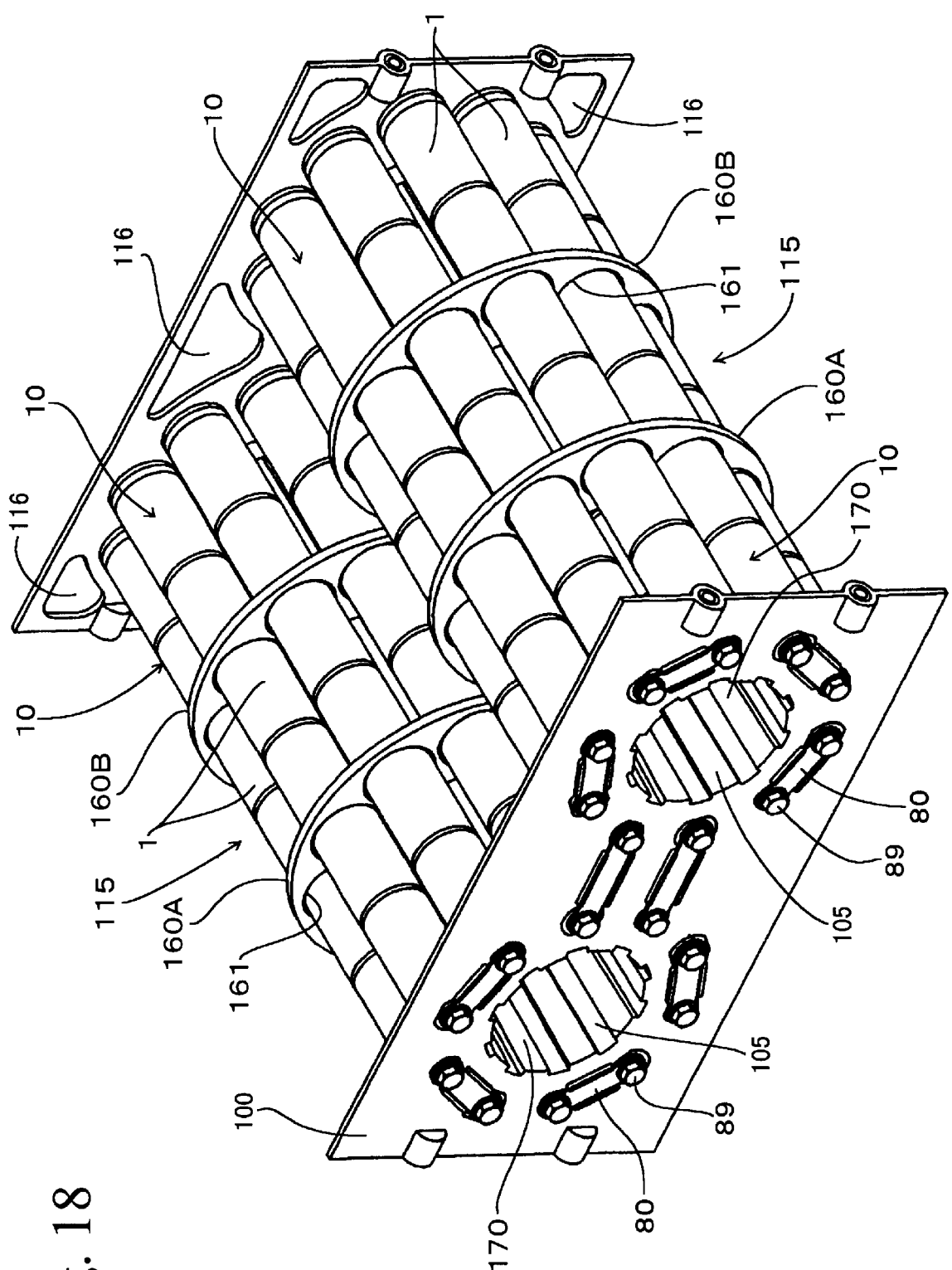
FIG. 18 is a perspective view showing an alignment of battery modules according to the fourth embodiment of the invention.

Next, the arrangement of the battery modules 10 will be explained hereinafter. As shown in FIGS. 17, 18, and 19, the battery modules 10 comprising the battery module group 115 are inserted into a disk-shaped pair of mounting plates 160A and 160B so as to be aligned in the circumference direction and so as to construct the cylindrical battery module group 115. The two battery module groups 115 are aligned in parallel and are connected by an upstream bus bar plate 100 and a downstream bus bar plate 110. In the housing body 141, the upstream bus bar plate 100 is disposed at one side which is upstream side of the cooling air, and the downstream bus bar plate 110 is disposed at another side which is downstream side of the cooling air. Plural bus bars 80 are disposed on the outer surfaces of the bus bar plates 100 and 110 and serially connect the positive terminals 11 and negative terminals 12, so that each battery modules is secured to the bus bar plates 100 and 110.

Figure 19A:
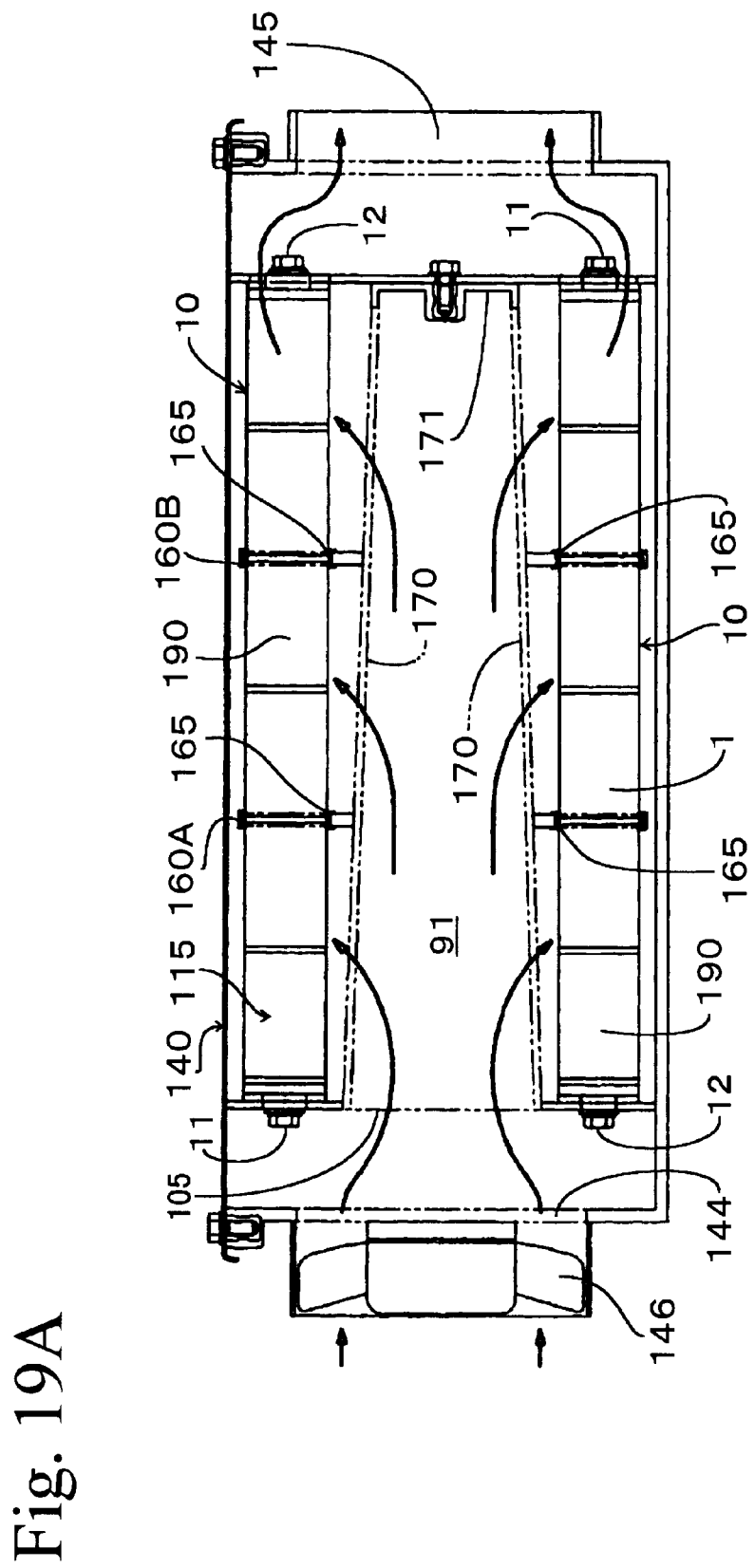
FIG. 19A is a side cross section and FIG. 19B is a front cross section of a battery module alignment according to the fourth embodiment of the invention.

As shown in FIG. 19A, the mounting plates 160A and 160B have the same outer diameter and have different inner diameters. The mounting plates 160A and 160B are formed with plural circular holes 161 into which the battery modules 10 are inserted in the circumferential direction at the same distance. When the mounting plates 160A and 160B overlap with each other so that the outer edges thereof coincide, the holes 161 coincide with each other, so that the battery modules 10 are aligned in parallel with each other As shown in FIG. 19A, a ring-shaped securing rib 165 is formed at the circumferential portion of the holes 161 of the mounting plates 160A and 160B. The securing rib 165 is formed with a pair of fitting surfaces (not shown) extending along the radial direction. The fitting surfaces fit with the flat faces 33 (see FIG. 10) formed on the opposite side surfaces of the insulating ring 30. The inner diameter of the securing rib 165 is designed such that the insulating ring 30 of the battery module 10 is pressed to fit thereinto and the insulating ring 30 is secured. The flat faces 33 and the fitting surfaces serve as an arrangement to restrict rotation of the insulating ring 30.

Figure 19B:
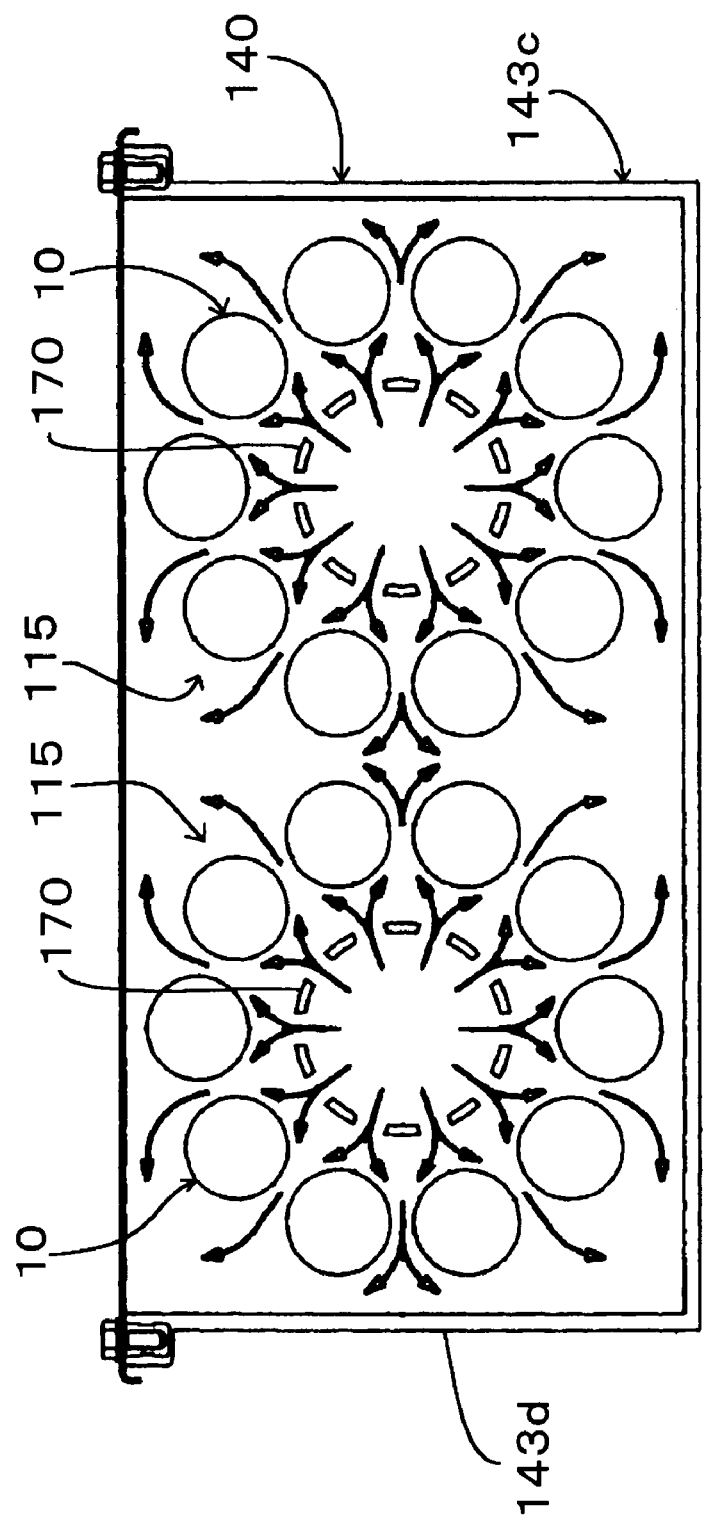

The mounting plates 160A and 160B are connected to each other by rectifying plates 170 fixed to the inner surfaces thereof. The rectifying plate 170 is a slender plate having a length slightly longer than the battery module 10. As shown in FIG. 19B, the number of rectifying plates 170 is same as that of the battery modules 10. That is, ten rectifying plates 170 are respectively disposed at a portion corresponding to the intermediate of two adjoined holes 161 at the same circumferential distance, and are fixed to the inner edges of the mounting plates 160A and 160B. The rectifying plates 170 are aligned in a conical shape in the entire configuration since the inner diameters of the mounting plates 160A and 160B are different from each other as shown in FIG. 19A, and the ends at the smallest diameter are connected by a disk-shaped connecting plate 171. The holes 161 of the mounting plates 160A and 160B are aligned with each other so that the battery module 10 can be linearly inserted. As shown in FIG. 19A, the distance between the mounting plates 160A and 160B is arranged so that the axial length of the battery module 10 is divided equally in three.

As shown in FIG. 17, two assemblies of the mounting plates 160A and 160B and the rectifying plates 170 are prepared, and they are aligned in parallel such that the mounting plates 160A and 160A, and 160B and 160B respectively adjoin. The opposite ends with respect to the ends connected by the rectifying plate 170 are fixed to the upstream bus bar plate 100 which is disposed at the upstream of the cooling air. Thus, the assemblies of the mounting plates 160A and 160B and rectifying plate 170 are unified via the upstream bus bar plate 100.

The upstream bus bar plate 100 is a rectangular resin plate and is formed with a pair of cooling air inlets 105 which communicate with the inner space of the rectifying plates 171 aligned in the conical shape. Positive terminal fitting holes 101 and negative terminal fitting holes 102 are formed around the cooling air inlets 105 alternatingly along the circumferential direction at the same distance. The positive terminal fitting hole 101 corresponds and fits to the positive terminal, and the negative terminal fitting hole 102 corresponds and fits to the negative terminal 12. More, specifically, the positive terminal fitting hole 101 is formed as a star-shape corresponding to the positive terminal 11, and the negative terminal fitting hole 102 is formed as approximately a circle having concavities fitting to the four protrusions 12b, corresponding to the negative terminal 12.

The battery modules 10 are inserted to the holes 161 of the mounting plates 160A and 160B from the reverse side of the upper bus bar plate 100, and the positive terminal 11 and the negative terminal 12 are fitted into the positive terminal fitting hole 101 and the negative terminal fitting hole 102 of the upstream bus bar plate 100. The battery modules 10 are aligned such that the positive terminal 11 and the negative terminal 12 are alternatingly adjoined. In inserting the battery module 10 into the hole 161 of the mounting plates 160A and 160B, the pair of flat faces 33 of the insulating ring 30 is coincided with the fitting surfaces of the securing ribs 165 and is pressed to fit therein, so that the insulating ring 30 is secured by the securing rib 165.

The circumferential rotation of the battery module 10 is restricted by the fitting of the flat faces 33 of the insulating ring 30 into the fitting. The adjoined positive terminal 11 and negative terminal 12 to be connected on the opposite ends surfaces of the battery module group 115 are regularly positioned along the circumferential direction so as to be connected. This is due to that the circumferential phases of the protrusion 11b of the positive terminal 11 and the protrusion 12b of the negative terminal 12 are deviated by K° (=360/H, 36° in the embodiment), wherein the number of the battery modules 10 comprising the battery module group 115 is defined as "H" as mentioned in the above.

The downstream bus bar plate 110 is made from a resin in a manner as similar to the upstream bus bar plate 100, and it has a rectangular shape with the same size as the plate 100. The downstream bus bar plate 110 is formed with positive terminal fitting holes 111 and negative terminal fitting holes 112 corresponding to the positive terminals 11 and the negative terminals 12. The fitting holes 111 and 112 are fitted to the terminals 11 and 12. In the downstream bus bar plate 110, cooling air outlets 116 are formed on the portions corresponding to the circumferential outside of the battery module group 115.

Similarly to the first embodiment, the upstream bus bar plate 100 and the downstream bus bar plate 110 are both tightened by bus bars 80 disposed on the outer surface thereof, and the positive terminal 11 and the negative terminal 12 are connected by the bus bar 80 in a regular manner. As shown in FIG. 19, the downstream bus bar plate 110 is also connected to the connecting plate 71 for connecting the rectifying plates 70.

As shown in FIG. 16, the pair of the battery module groups 115 is contained in the housing body 141 in the condition that the upstream bus bar plate 100 faces to the side plate 143a, and the downstream bus bar plate 110 faces to the side plate 143b. The opposite ends of the bus bar plates 100 and 110 are fixed to the side plates 143c and 143d. A cover 151 is put over the housing body 141, and these are secured by bolts 152, thus completing the assembly of the battery device of the embodiment. As shown in FIG. 19A, in the battery module group 115, the space along the axial direction of the battery module 10 is divided into plural spaces, thereby forming compartments 190. A cooling air path 191 is formed inside the battery module group 115.

The functions and the advantages of the fourth embodiment will be explained hereinafter.

According to the arrangement of the battery module 10 of the fourth embodiment, the intermediate portion of the battery module 10 is rigidly secured by the mounting plates 160A and 160B since the insulating ring 30 between the cells 1 is secured by the securing rib 165 of the mounting plates 160A and 160B. Therefore, vibration and bending of the battery module 10 is restrained, and the load exerted on the fixed portion of the battery module 10 can be relieved. As a result, the securing strength for the battery module 10 can be increased and the weight of the device can be further reduced. Moreover, since the rotation of the insulating ring 30 is restricted by fitting the flat faces 33 of the insulating ring 30 into the fitting surfaces of the securing ribs 165, the necessary securing strength of the mounting plates 160A and 160B against the insulating ring 30 can be relieved, and the weight of the device can be further reduced.

With respect to the arrangement of the battery module 10, since the cells 1 are connected by fitting the protrusion 23 of the connecting ring 20 into the concavity 31 of the insulating ring 30, the battery module 10 in which the circumferential positions (36° in the embodiment) of the opposite terminals 11 and 12 at the opposite ends are constant can be assembled. By using such battery modules 10, the bus bar plates 100, 110 can be easily fitted to the terminals 11 and 12. Furthermore, the insulating ring 30 covers a portion of the outer surface of the connecting ring 20 and radially projects therefrom, and the securing rib 165 is fitted to the insulating ring 30, so that the securing rib 165 does not contact the connecting ring 20. Therefore, the securing rib 165 and the mounting plates 160A and 160B can be formed from non-insulating materials, and materials having superior strength-weight ratios and rigidity-weight ratios, such as high-strength magnesium alloys and high-rigidity aluminum alloys, can be used, so that the weight can be further reduced.

The functions and advantages of the cooling arrangement of the embodiment will be explained hereinafter.

When the battery device operates and the cooling fan 146 starts to operate, as shown in FIG. 19A, the outside air is drawn therein and flows into the housing 140 from the cooling air inlet 144 as cooling air. The cooling air drawn in separately flows toward the right and left, and flows into the cooling air path 191 which is inside the battery module group 115 from the two cooling air inlets 105 of the upstream bus bar plate 100. Then, as shown in FIGS. 19A and 19B, the cooling air flow into the compartment 190 via the intervals between the rectifying plates 170, passes through the compartment 190, and flows outside the battery module groups 115. The cooling air which has flowed outside the battery module groups 115 is exhausted from the cooling air drawing portion 145 to the outside.

By the flow of the cooling air, fresh cooling air can contact the battery module 10 along the entire length thereof. In the cooling air path 191, the space for air becomes narrower downstream since the rectifying plates 170 are aligned in a conical shape. Therefore, the flow velocity of the cooling air increases toward the downstream direction. As a result, the flow rate of the cooling air flowing into the compartments 190 can be approximately even along the aligned direction of the battery modules 10 without deviation. Therefore, the battery modules 10 are uniformly cooled, and the charging and discharging efficiency and the service life are increased.

It should be noted that although the fourth embodiment provides the cooling air path 191 at the inner portion of the battery module group 115, a cooling air path may be provided at the peripheral outer portion of the battery module group 115, and the cooling air may flow from the outside to the inside so as to cool the battery module 10.

What is claimed is:

1. A charging element device comprising:
   columnar charging element modules arranged by serially connecting cylindrical cells via an insulating ring, the module having a terminal at opposite ends thereof;
   charging element module groups arranged by laterally aligning the charging element modules in parallel;
   a built-up construction of the charging element modules arranged by building-up the charging element module groups in several stages;
   bus bar plates disposed at opposite ends of the built-up construction of charging element modules and fitted to the terminals;
   bus bars disposed outside the bus bar plate and serially connecting the terminals;
   a housing in which cooling air flows and the built-up construction of the charging element modules is contained; and
   mounting plates having a securing ring for holding and securing the insulating ring, the mounting plate being provided below the lowermost charging element module group, above the uppermost charging element module group, and between the intermediate charging element module groups;
   wherein the mounting plates are integrally bound so as to hold and secure the insulating ring by the securing ribs;
   a restriction arrangement for rotation of the insulating ring is provided to the insulating ring and the securing rib.

2. A charging element device according to claim 1, wherein the mounting plate includes rectifying plates disposed between the charging element modules and extending along an axial direction of the charging element modules,
   whereby the cooling air passes through the interval of the rectifying plates and flows in the built-up direction of the charging element modules.

3. A charging element device according to claim 1, wherein the built-up construction of charging element modules has an upper surface and a lower surface, one of which serves as a cooling air inlet surface, and the built-up construction of charging element modules is inclined so that the cooling air inlet surface faces toward the upstream of the cooling air.

4. A charging element device according to claim 1, wherein the charging element module has opposite polarities in the terminals,
   four protrusions are formed along a concentric circle on the terminals, an end of the bus bar is fitted into inside of the protrusions,
   the phase of the protrusions on the terminal with the polarity is offset from the phase of the protrusions on the terminal with the opposite polarity so that one protrusion is positioned at an extending portion of the bus bar,
   the diameters of the concentric circles are different from each other, and
   the bus bar includes a hole which receives the one protrusion so as to allow the connection of the terminals by the bus bar.

5. A charging element device according to claim 3, wherein the device comprises a pair of the built-up construction of charging element modules,
   the built-up construction has opposite ends along the alignment direction of the charging element modules,
   an inner surface facing the other built-up construction, and an outer surface which is a reverse side of the inner surface,
   a pair of ends of the built-up constructions are in proximity to each other and the other pair of ends of the built-up constructions are apart from each other, whereby the built-up constructions are arranged in a V-shape, and
   one of the inner surfaces or one of the outer surfaces of the built-up constructions serves as a cooling air inlet surface.

6. A charging element device according to claim 1, wherein the number of the stages of the charging element module groups is less than the number of the charging element modules comprising the charging element module group.

7. A charging element device according to claim 1, wherein the mounting plate comprises partition members, which divide the space along an axial direction and the alignment direction of the charging element modules in a cubic pattern, and extend along the built-up direction of the charging element modules so as to form compartments serving as a cooling air path.

8. A charging element device comprising:

columnar charging element modules arranged by serially connecting cylindrical cells via an insulating ring, the module having a terminal at opposite ends thereof;

charging element module groups arranged by laterally aligning the charging element modules in parallel;

bus bar plates disposed at the opposite ends of the built-up construction of charging element modules and fitted to the terminals;

bus bars disposed outside the bus bar plate and serially connecting the terminals;

a housing in which cooling air flows and the built-up construction of the charging element modules is contained; and mounting plates disposed apart from each other in an axial direction of the charging element module, the mounting plates being arranged such that the charging element modules are inserted thereto and are circumferentially aligned to form the charging element module group;

holding and securing the insulating ring, the mounting plate being provided below the lowermost charging element module group, above the uppermost charging element module group, and between the intermediate charging element module groups; and a cooling air path disposed in a radially inner portion or a radially outer portion of the charging element module group;

wherein the mounting plate has securing ribs for fitting and securing the insulating rings, and a restriction arrangement for rotation of the insulating ring is provided to the insulating ring and the securing rib.

9. A charging element device according to claim 8, wherein the device comprises a connecting ring serially connecting the charging elements, the connecting ring is fitted to the insulating ring and an outer package of the charging element, which has one polarity thereof, and contacts the other charging element, and the connecting ring and the insulating ring have a positioning arrangement for circumferentially positioning the relative location thereof, and the insulating ring covers at least a portion of an outer surface of the connecting ring.

10. A charging element device according to claim 8, wherein the charging element module has opposite polarities in the terminals, the terminal with one polarity has a cross section different from that of the terminal with the other polarity, the terminal has a connecting portion at the center thereof, the bus bar plate has holes for corresponding and fitting to the terminals, wherein the bus bar plate is assembled with the charging element modules by corresponding and fitting the holes to the terminals.

11. A charging element device according to claim 8, wherein the charging element module has opposite polarities in the terminals, four protrusions are formed along a concentric circle on the terminals, an end of the bus bar is fitted into the inside of the protrusions, the phase of the protrusions on the terminal with the polarity is offset by K° which is calculated by the following equation (1) in which the number of the charging element modules is defined as "H", from the phase of the protrusions on the terminal with the other polarity, so that one protrusion is positioned at an extending portion of the bus bar, $$360/H=K \tag{1}$$

the diameters of the concentric circles are different from each other, and the bus bar includes a hole which receive the one protrusion so as to allow the connection of the terminals by the bus bar.

12. A charging element device according to claim 10, wherein the positive terminal and the negative terminal have a star-shaped or a circular cross section.

13. A charging element device according to claim 8, wherein the restriction arrangement for rotation of the insulating ring comprises a dowel provided to one of the insulating ring and the securing rib and a hole fitting the dowel provided to the other of the insulating ring and the securing rib.

14. A charging element device according to claim 8, wherein the restriction arrangement for rotation of the insulating ring comprises a flat face formed on an peripheral outer surface of the insulating ring and a fitting surface formed in the securing rib and fitting to the flat face.

* * * * *